(12) United States Patent
Kawai

(10) Patent No.: US 8,164,637 B2
(45) Date of Patent: Apr. 24, 2012

(54) DRIVING APPARATUS AND IMAGE PICKUP APPARATUS

(75) Inventor: Sumio Kawai, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 328 days.

(21) Appl. No.: 12/429,347

(22) Filed: Apr. 24, 2009

(65) Prior Publication Data
US 2009/0268042 A1 Oct. 29, 2009

(30) Foreign Application Priority Data

Apr. 25, 2008 (JP) .................. 2008-115869

(51) Int. Cl.
H04N 5/228 (2006.01)
G03B 17/00 (2006.01)
H01L 41/00 (2006.01)
H02N 2/00 (2006.01)

(52) U.S. Cl. .................. 348/208.4; 348/208.99; 396/55; 396/52; 310/323.02; 310/321; 310/311

(58) Field of Classification Search ............ 348/208.99–208.16; 396/52–55, 153, 248, 261; 968/488; 310/311–371
See application file for complete search history.

(56) References Cited

U.S. PATENT DOCUMENTS
2003/0067544 A1* 4/2003 Wada .................. 348/208.7

FOREIGN PATENT DOCUMENTS
JP 09-191670 7/1997
JP 2006-081348 3/2006

* cited by examiner

Primary Examiner — Mark Monk
(74) Attorney, Agent, or Firm — Volpe and Koenig, P.C.

(57) ABSTRACT

An X-axis driving mechanism section as one of driving sources of a driving apparatus including: a transducer for generating an elliptical vibration on a driving section in response to application of a predetermined frequency voltage signal; a bottom case having a holding section for holding the transducer; a pressing mechanism arranged on the bottom case to press the driving section of the transducer; and a rod relatively driven by the elliptical vibration of the transducer while being pressed by the pressing mechanism and with a moving direction being restricted by a guiding section of the holding member; wherein a weight is fixed to an end portion of the rod. The X-axis driving mechanism section constitutes the driving apparatus which is small and provides a large driving force, is capable of stable driving with higher efficiency without producing audible noise, and can retain the rod position and has high responsiveness with high accuracy.

8 Claims, 21 Drawing Sheets

DRIVING APPARATUS AND IMAGE PICKUP APPARATUS

This application claims benefit of Japanese Application No. 2008-115869 filed in Japan on Apr. 25, 2008, the contents of which are incorporated herein by this reference.

BACKGROUND OF THE INVENTION

1. Field of the Invention

The present invention relates to a driving apparatus which drives a movable body by use of an elliptical vibration of a transducer to move the movable body in a predetermined direction, and an image pickup apparatus, such as a digital camera, in which the driving apparatus performs shake correction.

2. Description of the Related Art

Some conventional image pickup apparatuses, such as cameras, are provided with a shake correction function. As the shake correction function for cameras, there is known a camera shake correction function for correcting blurring of an image on an image pickup plane of an image pickup device by detecting a shake in a pitch direction (a Y-axis direction) and a shake in a yaw direction (an X-axis direction) by use of a shake detector such as an angular velocity sensor, and shifting a portion of an image pickup optical system or an image pickup device to cancel the shake, independently in a horizontal direction (the X-axis direction) and a vertical direction (the Y-axis direction) in a plane perpendicular to a photographing optical axis based on a signal indicative of the detected shake.

In a camera shake correction mechanism which realizes the camera shake correction function, a driving apparatus for moving some of photographing lenses or the image pickup device itself in the horizontal direction and the vertical direction in the plane perpendicular to the photographing optical axis to correct a camera shake is used. The driving apparatus is required to have high responsiveness and be able to accurately (finely) drive a movable body to operate by following a camera shake, and also required to be able to retain a position of the movable body even after power-OFF.

In response to such requirements, Japanese Patent No. 3524248 discloses a configuration in which a vibration wave motor is pressed against a movable body guided in a predetermined direction to drive the movable body.

Also, Japanese Patent Application Laid-Open Publication No. 2006-81348 discloses a camera shake correction mechanism for driving a second substrate in the yaw direction by a first impact actuator fixed to a first substrate, and driving a third substrate on which an image pickup device is mounted by a second impact actuator fixed to the second substrate.

SUMMARY OF THE INVENTION

One driving apparatus according to the present invention includes: a transducer for generating an elliptical vibration on a driving section in response to application of a voltage signal of a predetermined frequency; a holding member having a holding section for holding the transducer; a pressing mechanism arranged on the holding member to press the driving section of the transducer; and a rod-shaped movable body relatively driven by the elliptical vibration of the transducer while being pressed by the pressing mechanism and with a moving direction of the movable body being restricted by a guiding section of the holding member; wherein a weight section is mounted on an end portion of the movable body.

Another driving apparatus according to the present invention includes: a first driving mechanism having a first transducer for generating an elliptical vibration on a driving section in response to application of a voltage signal of a predetermined frequency, a first holding member having a holding section for holding the first transducer, a first pressing mechanism arranged on the first holding member to press the driving section of the first transducer, and a first movable body relatively driven by the elliptical vibration of the first transducer while being pressed by the first pressing mechanism and with a moving direction of the first movable body being restricted by a guiding section of the first holding member; a second driving mechanism having a second transducer for generating an elliptical vibration on a driving section in response to application of a voltage signal of a predetermined frequency, a second holding member having a holding section for holding the second transducer, a second pressing mechanism arranged on the second holding member to press the driving section of the second transducer, and a second movable body relatively driven by the elliptical vibration of the second transducer while being pressed by the second pressing mechanism and with a moving direction of the second movable body being restricted by a guiding section of the second holding member; a fixing member to which the first holding member or the first movable body of the first driving mechanism is fixed; and a coupling body for coupling an end portion of the first movable body and an end portion of the second movable body; wherein the coupling body has a density equal to or higher than a density of the movable body.

One image pickup apparatus according to the present invention includes: a first driving mechanism having a first transducer for generating an elliptical vibration on a driving section in response to application of a voltage signal of a predetermined frequency, a first holding member having a holding section for holding the first transducer, a first pressing mechanism arranged on the first holding member to press the driving section of the first transducer, and a first movable body relatively driven by the elliptical vibration of the first transducer while being pressed by the first pressing mechanism and with a moving direction of the first movable body being restricted by a guiding section of the first holding member, the first movable body being rotatably held about a first axis parallel to the moving direction, and a weight section being mounted on an end portion of the first movable body; a second driving mechanism having a second transducer for generating an elliptical vibration on a driving section in response to application of a voltage signal of a predetermined frequency, a second holding member having a holding section for holding the second transducer, a second pressing mechanism arranged on the second holding member to press the driving section of the second transducer, and a second movable body relatively driven by the elliptical vibration of the second transducer while being pressed by the second pressing mechanism and with a moving direction of the second movable body being restricted by a guiding section of the second holding member, the second movable body being rotatably held about a second axis parallel to the moving direction, and a weight section being mounted on an end portion of the second movable body; a movable frame fixed to the second holding member; a fixing member on which the first holding member or the first movable body of the first driving mechanism is mounted; a coupling body for coupling the first movable body or the first holding member and the second movable body or the second holding member such that driving directions of the first movable body or the first holding member and the second movable body or the second holding member substantially perpendicularly intersect with each other at an end portion; rolling bodies respectively press-held between the movable frame and the fixing member at positions apart from the first axis and the second axis to restrict rotation about the first axis and rotation about the second axis; an image pickup device mounted on the movable frame to convert an image formed by a photographing lens to an electrical signal; and a shake detector for detecting a shake of a camera main body to which the fixing member and the photographing lens are attached; wherein shake correction is performed by driving the first driving mechanism and the second driving mechanism based on a signal from the shake detector.

The driving apparatus and the image pickup apparatus according to the present invention are small and can drive the movable body with high efficiency. Other features and advantages of the present invention will become apparent from the following description.

DETAILED DESCRIPTION OF THE PREFERRED EMBODIMENTS

In the following, embodiments of the present invention will be described with reference to the drawings.

In an image pickup apparatus according to one embodiment of the present invention, a driving apparatus for performing camera shake correction of an image pickup unit including an image pickup device that obtains an image signal by photoelectric conversion is mounted. Here, a case in which the image pickup apparatus is applied to a single-lens reflex digital camera with an interchangeable lens will be described as an example.

Figure 1:
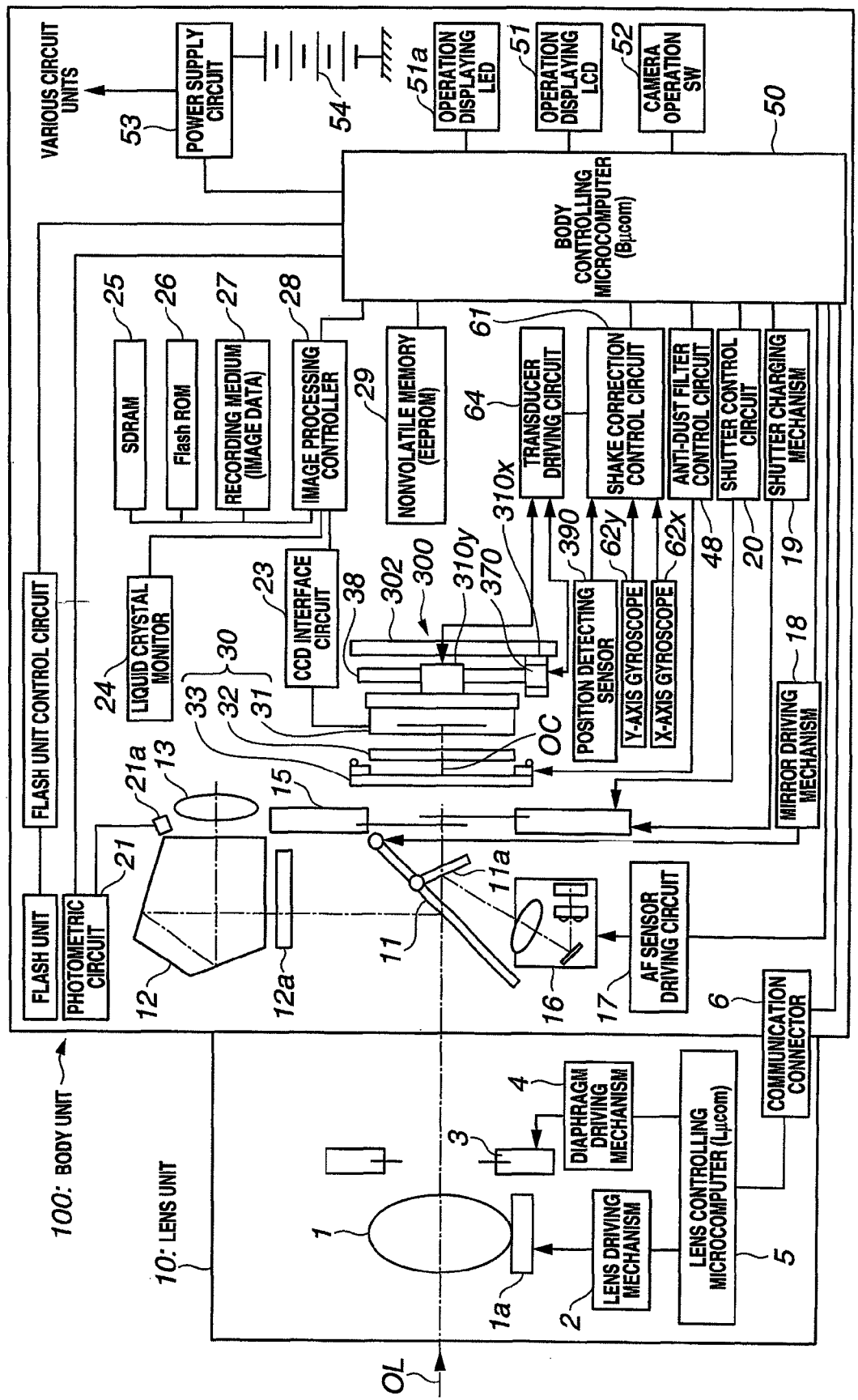
FIG. 1 is a block diagram schematically showing a system configuration of a camera including a shake correction unit according to an embodiment of the present invention.

First, a system configuration example of a single-lens reflex digital camera (referred to as camera below) according to the present embodiment will be described with reference to FIG. 1. FIG. 1 is a block diagram schematically showing a system configuration of the camera according to the present embodiment.

In the camera according to the present embodiment, a body unit 100 having a camera main body as an image pickup apparatus, and a lens unit 10 as an interchangeable lens, which is one of accessories, constitute a camera system.

The lens unit 10 is detachably attached to the body unit 100 via an unillustrated lens mount provided on a front surface of the body unit 100. The lens unit 10 is controlled by a lens controlling microcomputer (referred to as Lμcom below) 5 provided in the lens unit itself. The body unit 100 is controlled by a body controlling microcomputer (referred to as Bμcom below) 50. The Lμcom 5 and the Bμcom 50 are electrically connected to each other in a communicatable manner via a communication connector 6 when the lens unit 10 is mounted on the body unit 100. The camera system is configured such that the Lμcom 5 operates dependently on and in cooperation with the Bμcom 50.

The lens unit 10 includes a photographing lens 1 and a diaphragm 3 arranged on a photographing lens optical axis OL. The photographing lens 1 is driven by an unillustrated DC motor provided in a lens driving mechanism 2. The diaphragm 3 is driven by an unillustrated stepping motor provided in a diaphragm driving mechanism 4. The Lμcom 5 controls the respective motors based on a command from the Bμcom 50.

Following components are arranged in the body unit 100 as shown in FIG. 1. For example, the body unit 100 includes single-lens reflex components (a pentaprism 12, a quick-return mirror 11, an eyepiece 13, and a sub-mirror 11a) as an optical system, a focal-plane shutter 15 on the photographing lens optical axis OL, and an AF sensor unit 16 for detecting an amount of defocus based on a light flux reflected from the sub-mirror 11a.

The body unit 100 further includes an AF sensor driving circuit 17 for controlling drive of the AF sensor unit 16, a mirror driving mechanism 18 for controlling drive of the quick-return mirror 11, a shutter charging mechanism 19 for charging a spring that drives a front curtain and a rear curtain of the shutter 15, a shutter control circuit 20 for controlling movement of the front and rear curtains, and a photometric circuit 21 for performing photometric processing using a photometric sensor 21a that detects a light flux from the pentaprism 12.

Figure 2:
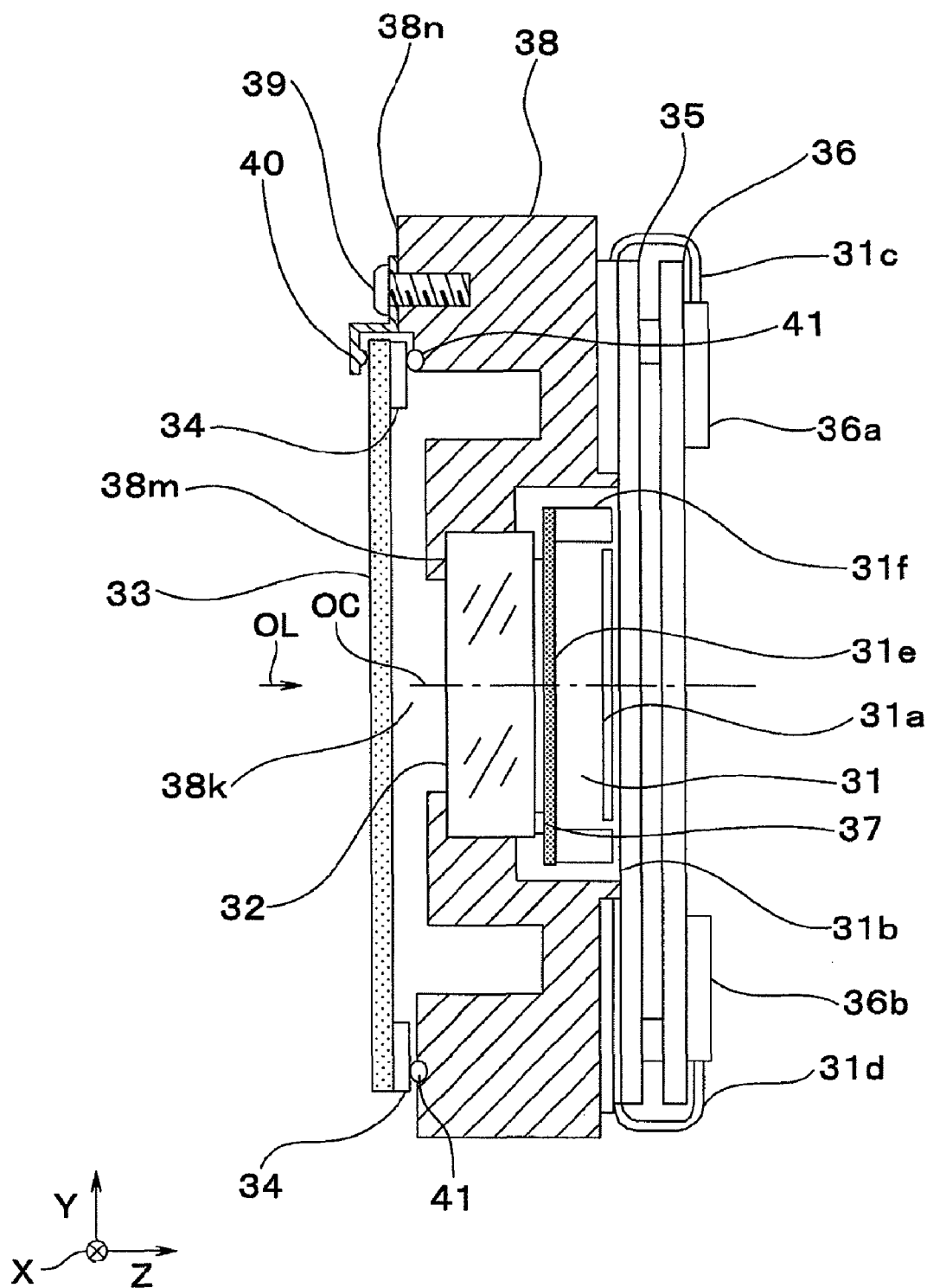
FIG. 2 is a vertical sectional view showing a configuration example of an image pickup unit applied to the camera in FIG. 1.
Figure 7:
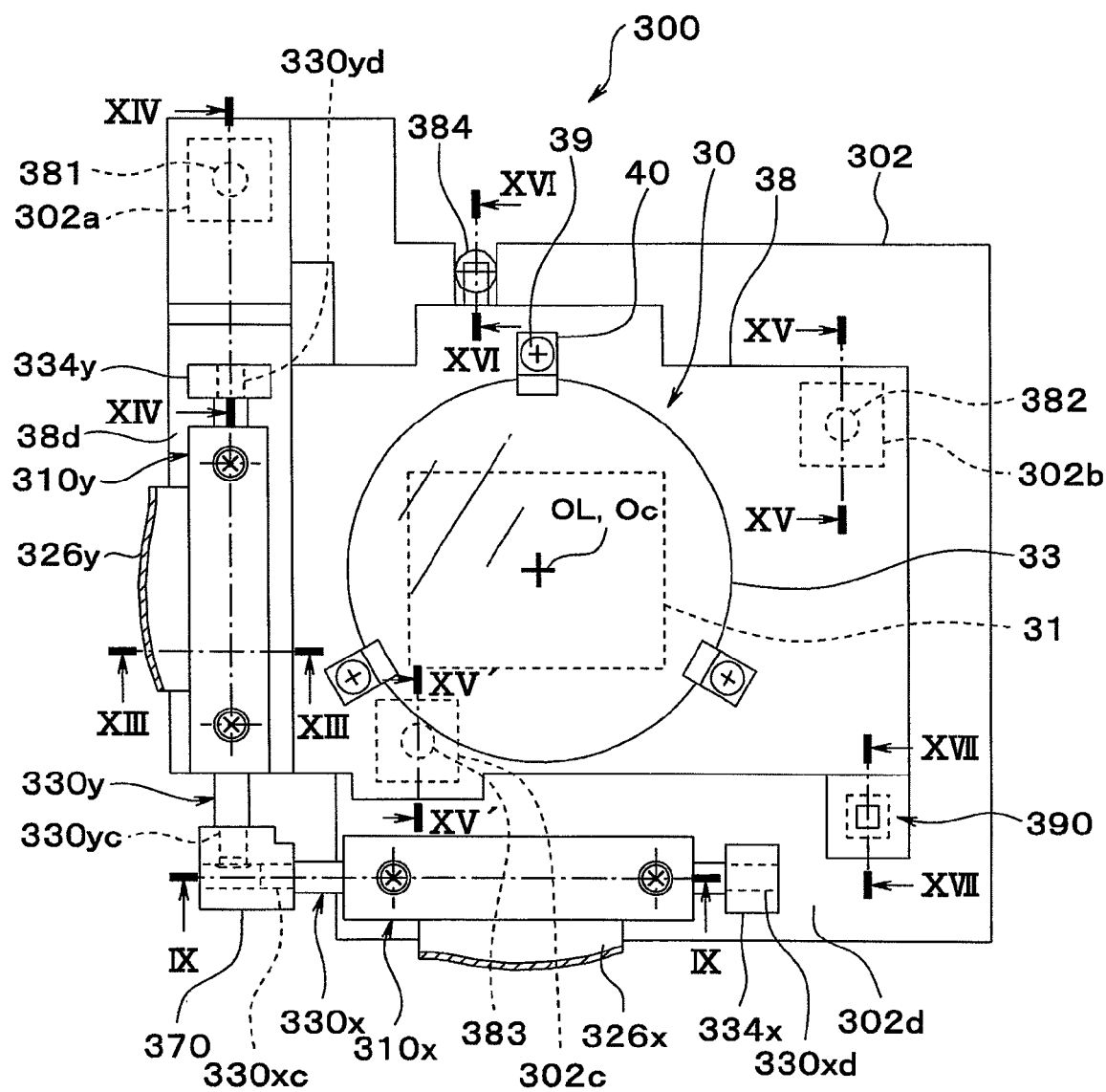
FIG. 7 is an elevation view showing a configuration example of a shake correction unit applied to the camera in FIG. 1.

An image pickup unit 30 for photoelectrically converting a subject image that has passed through the above optical system is provided on the photographing lens optical axis OL. The image pickup unit 30 is an integrated unit having a CCD 31 as an image pickup device having an image pickup optical axis OC, an optical low-pass filter (LPF) 32 arranged in front of the CCD 31, and an anti-dust filter 33. A piezoelectric device 34 is attached to a peripheral portion of the anti-dust filter 33 (FIG. 2). The piezoelectric device 34 has two electrodes. An anti-dust filter control circuit 48 causes the piezoelectric device 34 to vibrate at a predetermined frequency, to vibrate the anti-dust filter 33, so that dust attaching to a filter surface is removed therefrom. The image pickup unit 30 is mounted on a shake correction unit 300 that is a driving apparatus for correcting a camera shake described later (FIG. 7).

The camera system according to the present embodiment also includes a CCD interface circuit 23 connected to the CCD 31, a liquid crystal monitor 24, and an image processing controller 28 for performing image processing by use of an SDRAM 25, a Flash ROM 26 and the like serving as a storage area, so as to offer an electronic recording and displaying function as well as an electronic image pickup function. A recording medium 27 is an external recording medium such as various memory cards and external HDDs, and is removably mounted on the camera main body such that the recording medium can communicate with the camera main body via a communication connector. Image data obtained by photographing is recorded in the recording medium 27. As another storage area, a nonvolatile memory 29 such as an EEPROM, which stores predetermined control parameters required for camera control, is provided so as to be accessible from the Bμcom 50.

The Bμcom 50 includes an operation displaying LCD 51 and an operation displaying LED 51a for informing a user of an operating state of the camera through a display output, and a camera operation switch (switch will be abbreviated as SW below) 52. The camera operation SW 52 is a switch group including operation buttons necessary for operating the camera, such as a release SW, a mode change SW, and a power SW. A battery 54 as a power supply, and a power supply circuit 53 for converting a voltage of the battery 54 to a voltage required in each circuit unit that constitutes the camera system and supplying the voltage to each circuit unit are also provided. A voltage detecting circuit for detecting a voltage change occurring when a current is supplied from an external power supply via a jack is also provided.

The respective components of the camera system arranged as described above schematically operate as described below. First, the image processing controller 28 controls the CCD interface circuit 23 to acquire image data from the CCD 31 in accordance with a command from the Bμcom 50. The image data is converted to a video signal in the image processing controller 28, and the video signal is outputted to be displayed on the liquid crystal monitor 24. A user can check a photographed image based on the image displayed on the liquid crystal monitor 24.

The SDRAM 25 is a memory for temporarily storing image data, and is used as a work area when the image data is converted. The image data is converted to JPEG data, and then, the JPEG data is stored in the recording medium 27.

The mirror driving mechanism 18 is a mechanism for driving the quick-return mirror 11 to an up position and a down position. When the quick-return mirror 11 is at the down position, a light flux from the photographing lens 1 is divided and led to the AF sensor unit 16 and the pentaprism 12. An output from an AF sensor in the AF sensor unit 16 is transmitted through the AF sensor driving circuit 17 to the Bμcom 50, where well-known ranging processing is performed. A portion of the light flux passing through the pentaprism 12 is led to the photometric sensor 21a in the photometric circuit 21, where well-known photometric processing is performed based on a detected light intensity.

Next, the image pickup unit 30 including the CCD 31 mounted on the shake correction unit 300 will be described with reference to FIG. 2. FIG. 2 is a vertical sectional view showing a configuration example of the image pickup unit 30.

The image pickup unit 30 includes the CCD 31 as the image pickup device for obtaining an image signal corresponding to light passing through the photographing optical system and emitted onto a photoelectric conversion plane of the CCD, the optical low-pass filter (LPF) 32 arranged on the photoelectric conversion plane side of the CCD 31 to remove a high frequency component from the light flux of a subject passing through the photographing optical system and emitted thereto, the anti-dust filter 33 oppositely arranged on a front surface side of the optical LPF 32 with a predetermined distance therebetween, and the piezoelectric device 34 arranged on the peripheral portion of the anti-dust filter 33 to apply a predetermined vibration to the anti-dust filter 33. The image pickup optical axis OC is an optical axis on the photoelectric conversion plane of the CCD 31. Of course, the image pickup optical axis OC is parallel to the photographing lens optical axis OL (a Z direction).

A CCD chip 31a of the CCD 31 is directly mounted on a flexible printed circuit (FPC) 31b that is arranged on a fixing plate 35. Connecting sections 31c and 31d extending from both ends of the FPC 31b are connected to a main circuit board 36 via connectors 36a and 36b provided on the main circuit board 36. A protective glass 31e of the CCD 31 is fixed to the FPC 31b via a spacer 31f.

A filter receiving member 37 formed of an elastic member or the like is interposed between the CCD 31 and the optical LPF 32. The filter receiving member 37 is located at a position on a front side peripheral portion of the CCD 31 away from an effective area of the photoelectric conversion plane. The filter receiving member 37 is also in abutment with the vicinity of a rear side peripheral portion of the optical LPF 32. A space between the CCD 31 and the optical LPF 32 is thereby substantially hermetically sealed. A holder 38 for hermetically covering the CCD 31 and the optical LPF 32 is also provided.

The holder 38 has a rectangular opening 38k in a substantially center portion around the image pickup optical axis OC. A step section 38m having a substantially L shape in section is formed on an inner peripheral portion of the opening 38k on the anti-dust filter 33 side. The optical LPF 32 and the CCD 31 are arranged on a rear side of the opening 38k. A front side peripheral portion of the optical LPF 32 is arranged in contact with the step section 38m in a substantially hermetical manner, so that the optical LPF 32 is position-restricted in the direction of the image pickup optical axis OC (the Z direction) by the step section 38m, and is prevented from falling off from the holder 38 to the front side thereof.

Meanwhile, an anti-dust filter receiving section 38n projecting forward from the step section 38m around the step section 38m is formed along an entire peripheral portion of the holder 38 on the front side to hold the anti-dust filter 33 in front of the optical LPF 32 with a predetermined distance therebetween. The anti-dust filter 33 having a circular or polygonal plate shape as a whole is supported in the anti-dust filter receiving section 38n in a pressed state by a pressing member 40 that is formed of an elastic body such as a leaf spring and is fixed to the anti-dust filter receiving section 38n with a screw 39. A ring-shaped seal 41 is interposed between the piezoelectric device 34 arranged on an outer peripheral portion of the anti-dust filter 33 on a rear side and the anti-dust filter receiving section 38n, so that a hermetical state is ensured. In this manner, the image pickup unit 30 has a hermetical structure with the holder 38 formed into a desired size on which the CCD 31 is mounted.

The camera according to the present embodiment has a camera shake correction function for acquiring a photographed image with no camera shake by moving the CCD 31 as the image pickup device in response to a camera shake of the body unit 100 occurring during photographing such that the camera shake is compensated for. In the camera, it is supposed that the direction of the photographing lens optical axis OL (or the image pickup optical axis OC) is the Z direction, and a first direction and a second direction perpendicular to each other in a plane (an XY plane) perpendicular to the Z direction are respectively an X direction (a direction parallel to an X axis) and a Y direction (a direction parallel to a Y axis). In this case, the shake correction unit 300 (FIG. 7) that is the driving apparatus for correcting a camera shake which displaces the CCD 31 of the image pickup unit 30 in the X direction and the Y direction such that the shake is compensated for is applied to the camera. In the shake correction unit 300, an elliptical vibration is generated on a driver of a transducer as a driving source of the driving apparatus by applying a voltage of a predetermined frequency to the transducer, and the holder 38 as a moving target on which the CCD 31 of the image pickup unit 30 is mounted is driven and displaced.

Figure 3:
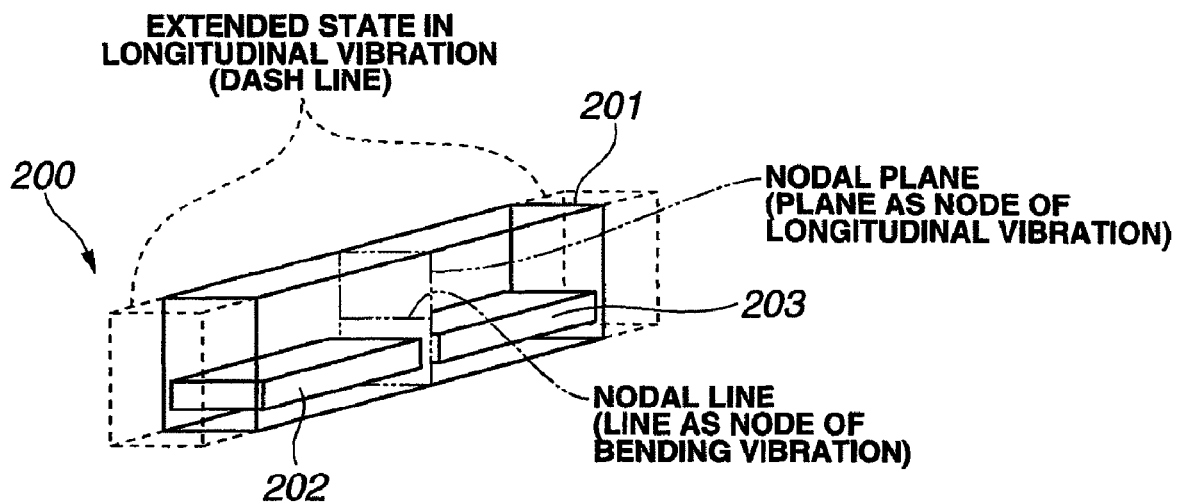
FIG. 3 is a schematic view of a transducer as a driving source of a shake correction unit applied to the camera in FIG. 1.
Figure 4A:
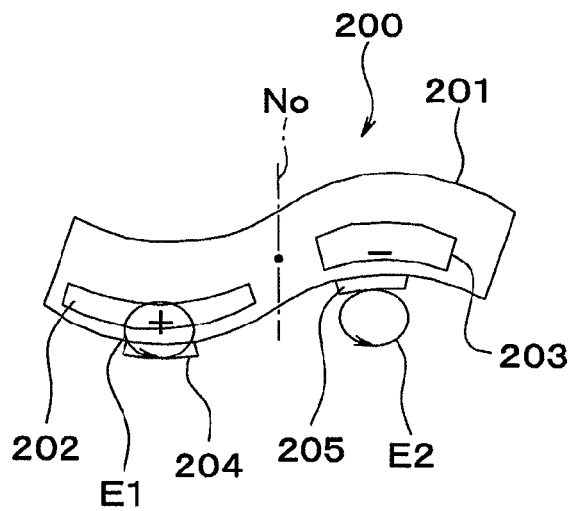
FIGS. 4A to 4C are schematic views showing a vibration state of the transducer in FIG. 3.
Figure 4B:
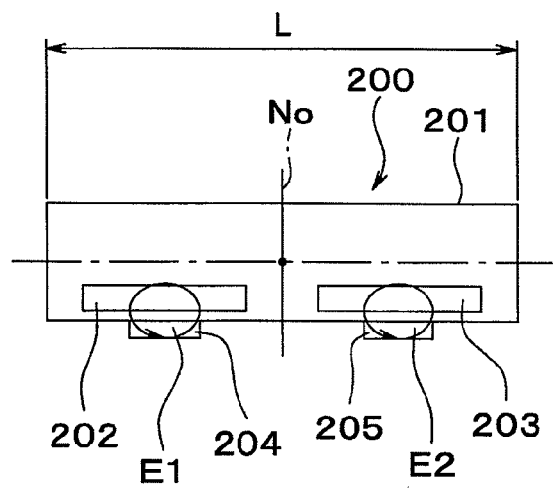
Figure 4C:
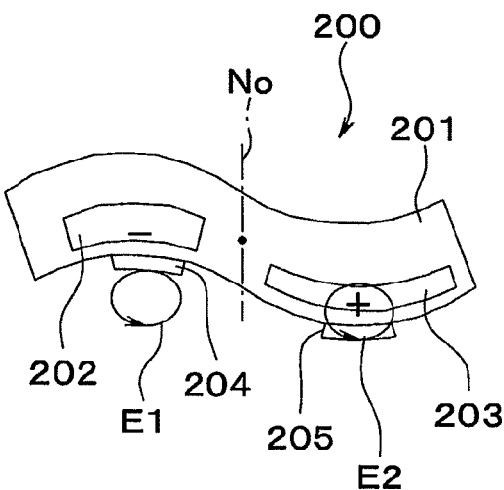
Figure 5A:
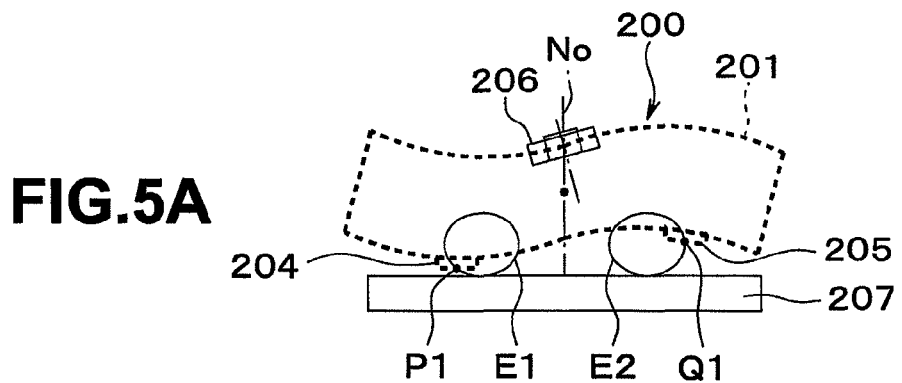
FIGS. 5A to 5D are schematic views showing a vibration process of the transducer in FIG. 3.
Figure 5B:
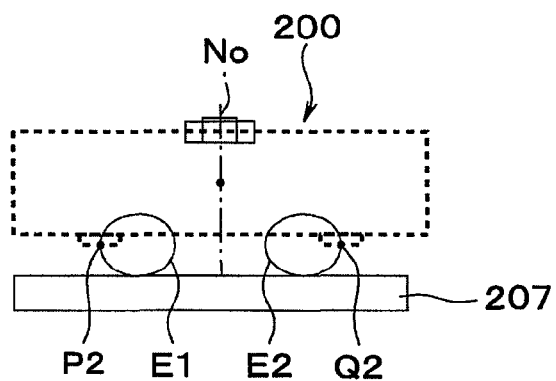
Figure 5C:
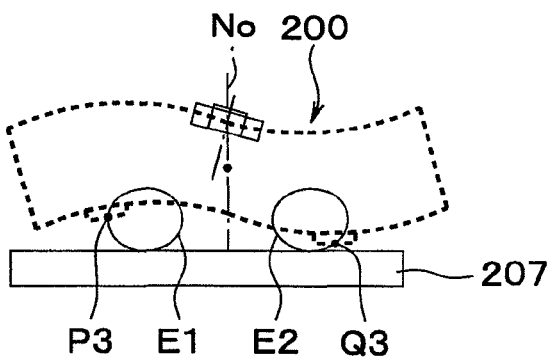
Figure 5D:
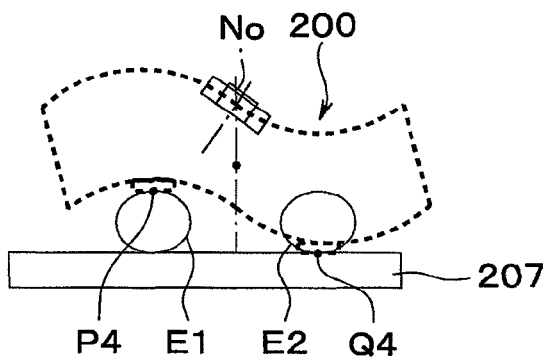
Figure 6A:
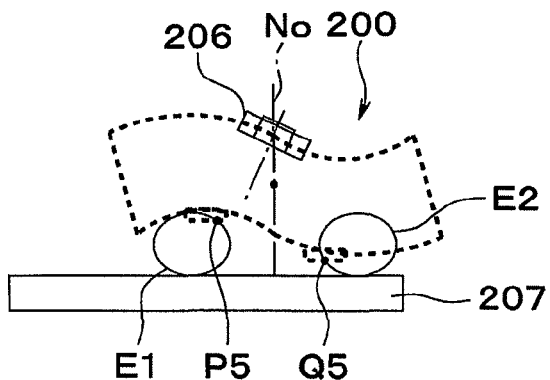
FIGS. 6A to 6D are schematic views showing a vibration process of the transducer in FIG. 3.
Figure 6B:
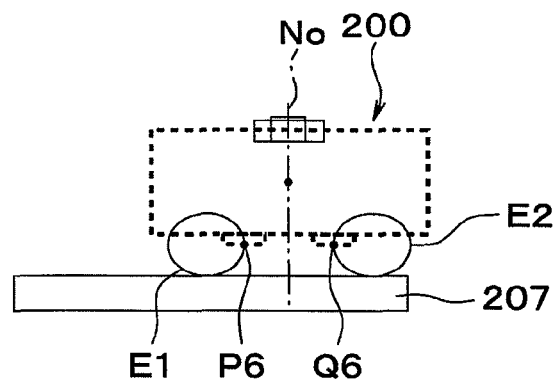
Figure 6C:
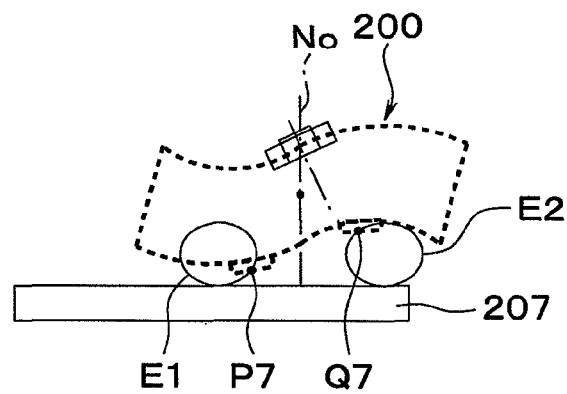
Figure 6D:
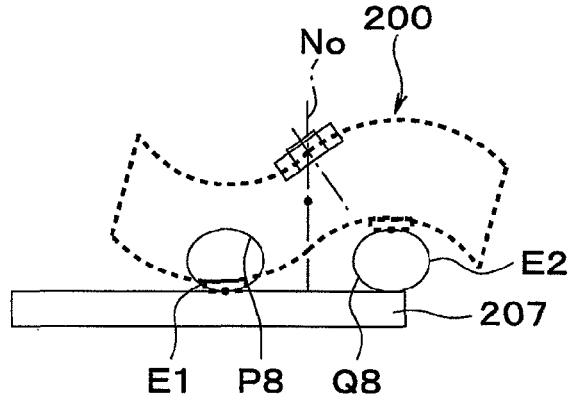

Next, an operating principle of the transducer used as the driving source of the driving apparatus for correcting a camera shake of the camera according to the present embodiment will be described with reference to FIGS. 3 to 6. FIG. 3 is a schematic view of the transducer. FIGS. 4A to 4C are schematic views showing the operating principle of the transducer. FIGS. 5A to 5D and FIGS. 6A to 6D are schematic views showing a vibration process of the transducer.

As shown in FIG. 3, a transducer 200 includes a rectangular parallelepiped piezoelectric body 201 having a predetermined size, a pair of driving areas 202 and 203 formed on one surface side of the piezoelectric body 201 to be centrally symmetric by polarization, and drivers 204 and 205 as driving sections provided on a surface of the piezoelectric body 201 at positions respectively corresponding to the driving areas 202 and 203.

When a positive voltage is applied to the driving area 202 in a state in which no voltage is being applied to the driving areas as shown in FIG. 4B (the transducer has a length L), the entire driving area 202 is deformed in an arc shape with a portion of the piezoelectric body 201 around the polarized driving area 202 being deformed to extend, and a portion of the piezoelectric body 201 on a rear surface side thereof not being deformed to extend as shown in FIG. 4A. To the contrary, when a negative voltage is applied to the driving area 202, the entire driving area 202 is deformed in a reverse arc shape to the one shown in FIG. 4A with the portion of the piezoelectric body 201 around the polarized driving area 202 being deformed to contract, and the portion of the piezoelectric body 201 on the rear surface side thereof not contracting as shown in FIG. 4C. The same applies to the driving area 203.

In order to generate an elliptical vibration on surfaces of the drivers 204 and 205, a sinusoidal wave voltage of a predetermined frequency is applied to the driving area 202 that is one of the polarized areas of the piezoelectric body 201, and a sinusoidal wave voltage of the same frequency as, but out of phase with, the voltage applied to the driving area 202 is applied to the driving area 203 that is the other one of the polarized areas. The frequency of the voltage to be applied is set to a predetermined value such that a center of the piezoelectric body 201 corresponds to a node NO of a bending vibration, the drivers 204 and 205 correspond to antinodes of the bending vibration, and a node of a longitudinal vibration of the piezoelectric body 201 matches the node of the bending vibration.

In accordance with a change in signs of + and − of the voltage of the predetermined frequency to be applied, the transducer 200 repeats a vibration composed of the bending vibration and the longitudinal vibration shown in FIGS. 5A to 5D and FIGS. 6A to 6D, and elliptical vibrations E1 and E2 are respectively generated on the surfaces of the drivers 204 and 205. By arranging the drivers 204 and 205 of the transducer 200 in pressure contact with a movable body 207 as a driving target via a holder 206, the movable body 207 is moved in the direction of the elliptical vibrations E1 and E2 occurring on the surfaces of the drivers 204 and 205.

By changing a phase difference between the voltages of the predetermined frequency applied to the driving areas 202 and 203, the elliptical vibrations E1 and E2 occurring on the surfaces of the drivers 204 and 205 can be changed in shape. Accordingly, a moving speed of the movable body driven by the transducer 200 can be changed. For example, when the phase difference between the voltages of the predetermined frequency is 0 degree, the speed is 0. As the phase difference increases, the speed gradually increases. When the phase difference is 90 degrees, the speed reaches its maximum. To the contrary, as the phase difference increases over 90 degrees, the speed gradually decreases. When the phase difference is 180 degrees, the speed is 0 again. When the phase difference is negative, a rotational direction of the elliptical vibrations E1 and E2 occurring on the drivers 204 and 205 is reversed, so that the movable body can be driven in a reverse direction. In this case, the speed also reaches its maximum when the phase difference is −90 degrees.

A configuration and operation of the shake correction unit 300, which is incorporated in the camera of the present embodiment as the driving apparatus for correcting a camera shake in which the aforementioned transducer is used as the driving source, will be described with reference to FIGS. 7 to 19.

Figure 8:
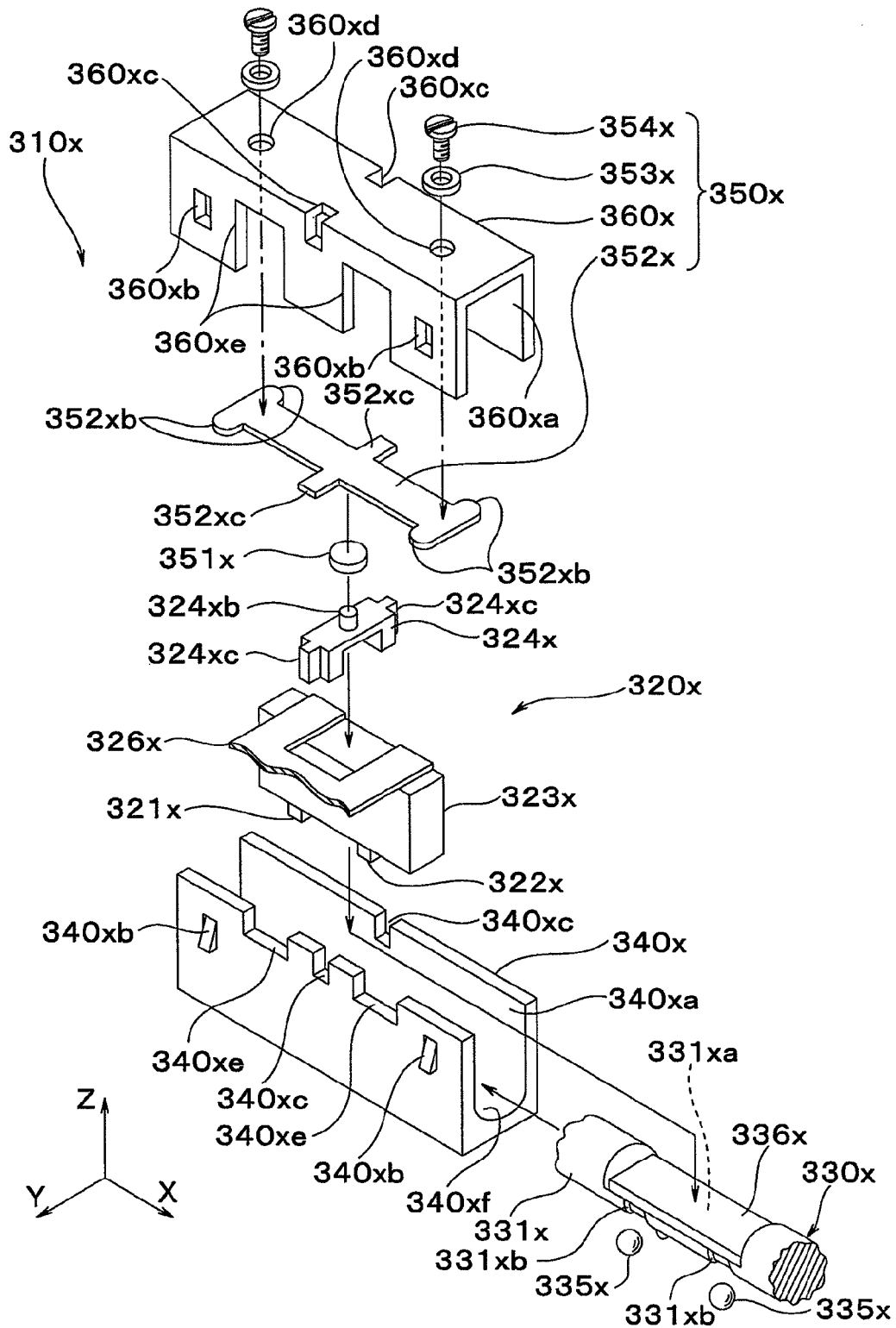
FIG. 8 is an exploded perspective view of an X-axis driving mechanism section including a driving source of the shake correction unit in FIG. 7.
Figure 9:
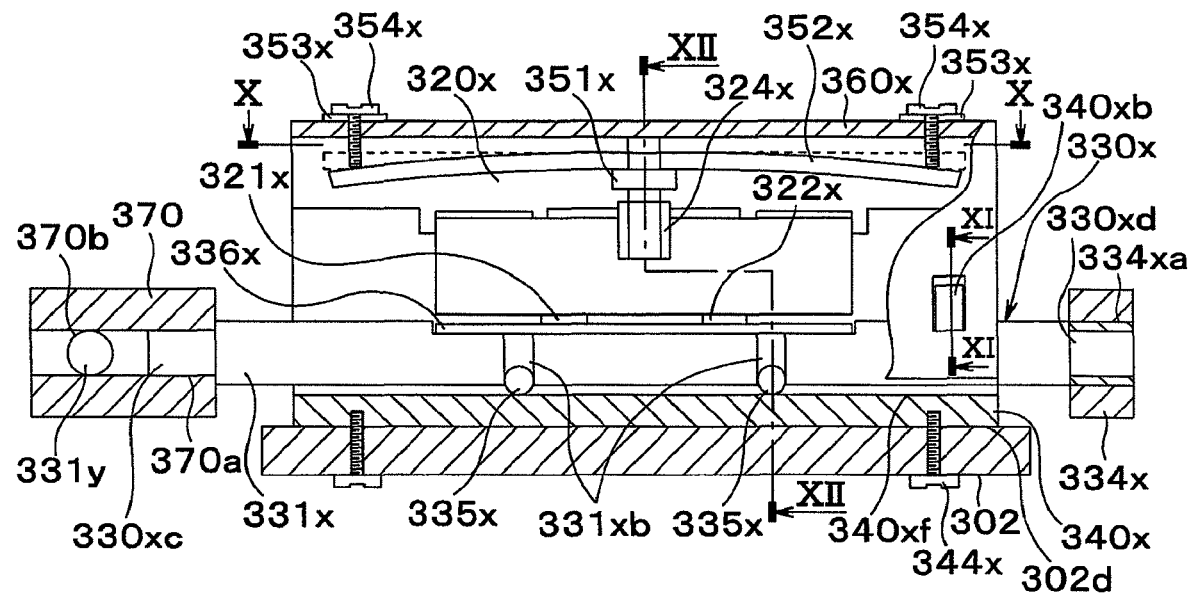
FIG. 9 is a sectional view taken along the line IX-IX in FIG. 7, where a top case is partly not shown in section.
Figure 10:
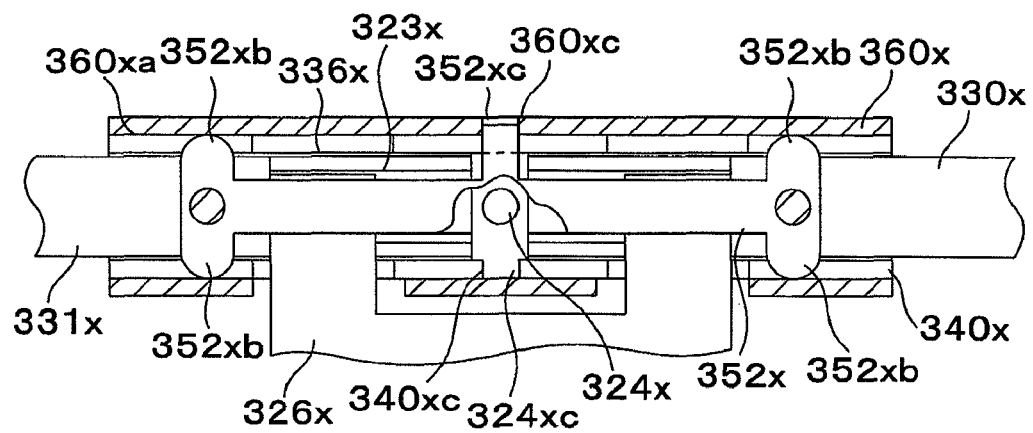
FIG. 10 is a sectional view taken along the line X-X in FIG. 9.
Figure 11:
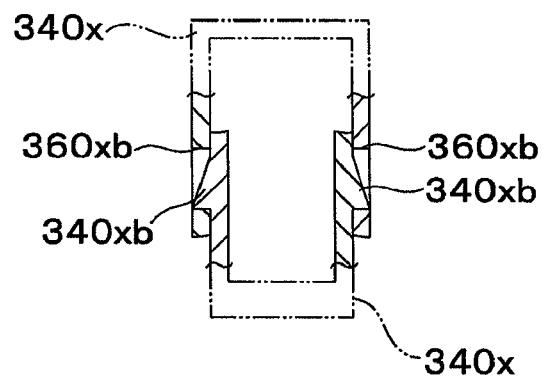
FIG. 11 is a sectional view taken along the line XI-XI in FIG. 9.
Figure 12:
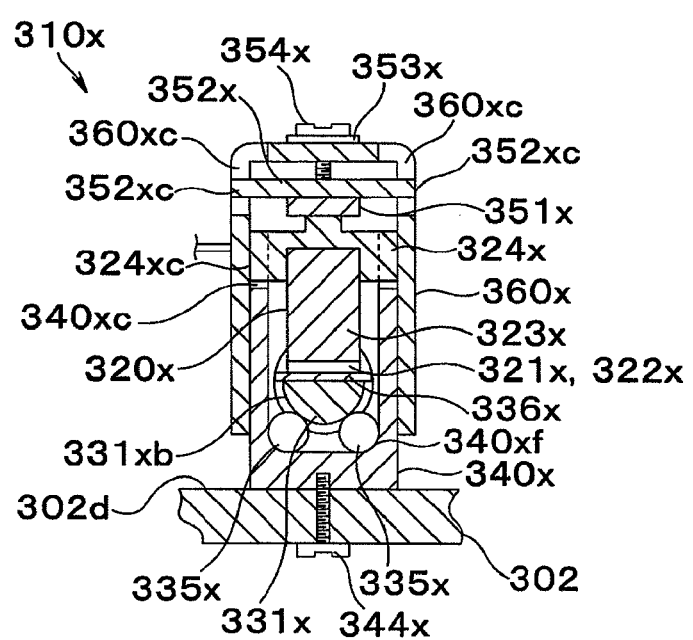
FIG. 12 is a sectional view taken along the line XII-XII in FIG. 9.

FIG. 7 is an elevation view showing a configuration example of the shake correction unit according to the present embodiment. FIG. 8 is an exploded perspective view of an X-axis driving mechanism section including the driving source of the shake correction unit. FIG. 9 is a sectional view taken along the line IX-IX in FIG. 7, where a top case is partly not shown in section. FIG. 10 is a sectional view taken along the line X-X in FIG. 9. FIG. 11 is a sectional view taken along the line XI-XI in FIG. 9. FIG. 12 is a sectional view taken along the line XII-XII in FIG. 9.

Figure 13:
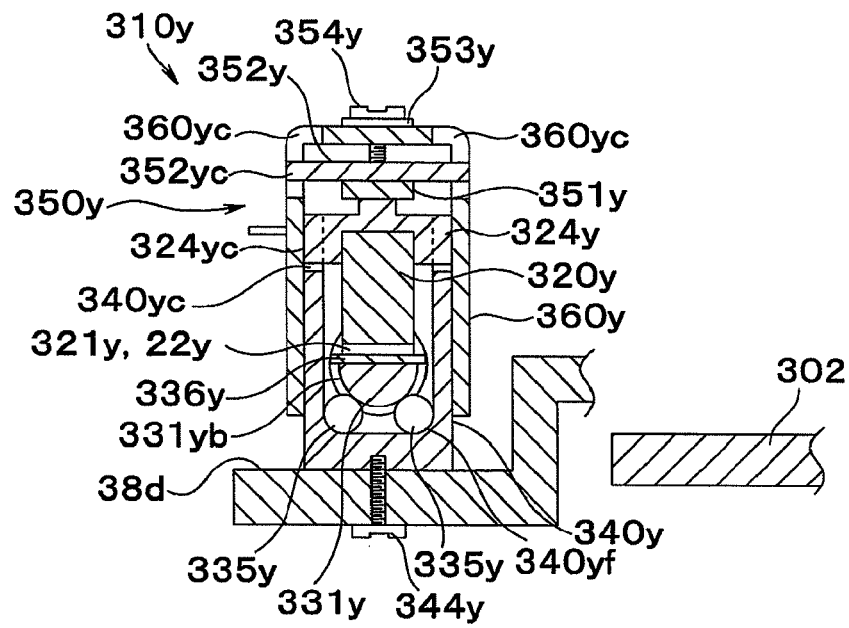
FIG. 13 is a sectional view taken along the line XIII-XIII in FIG. 7.
Figure 14:
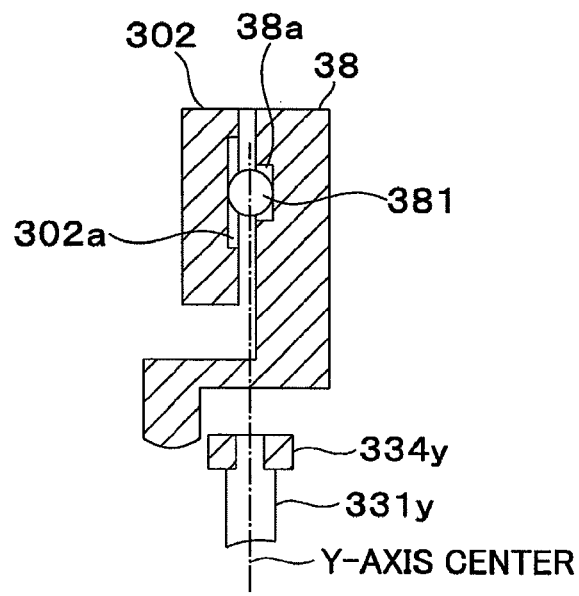
FIG. 14 is a sectional view taken along the line XIV-XIV in FIG. 7.
Figure 15:
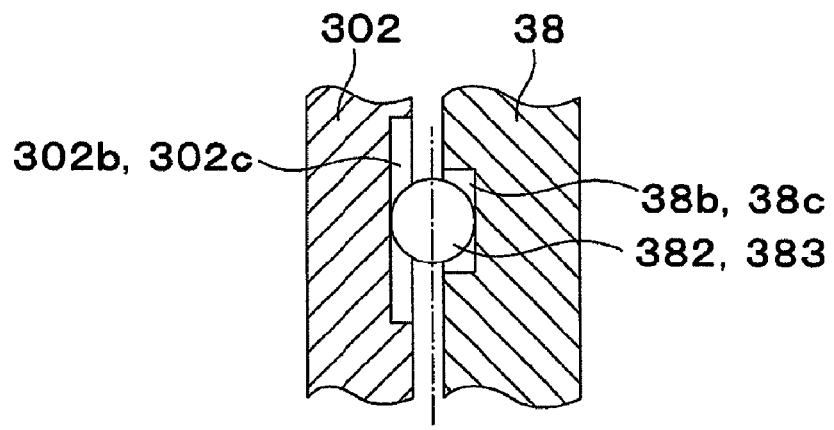
FIG. 15 is a sectional view taken along the line XV-XV or XV'-XV' in FIG. 7.
Figure 16:
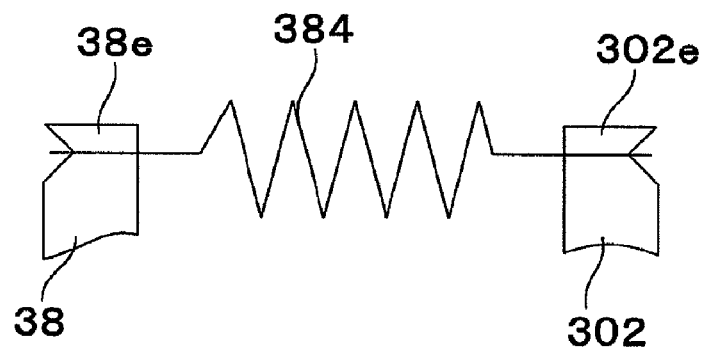
FIG. 16 is a sectional view taken along the line XVI-XVI in FIG. 7.
Figure 17:
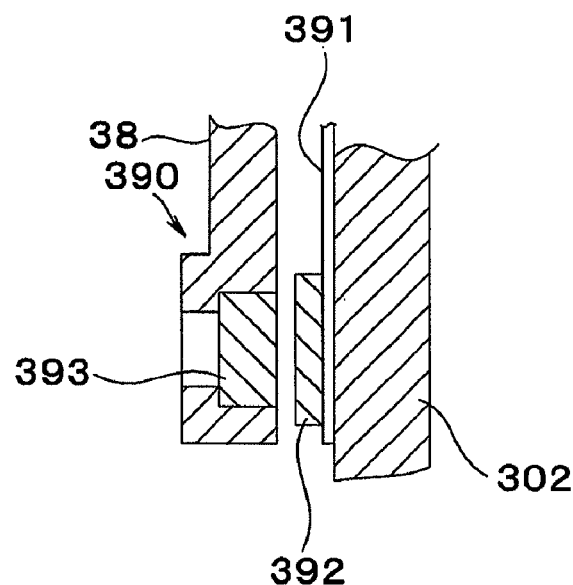
FIG. 17 is a sectional view taken along the line XVII-XVII in FIG. 7.
Figure 18:
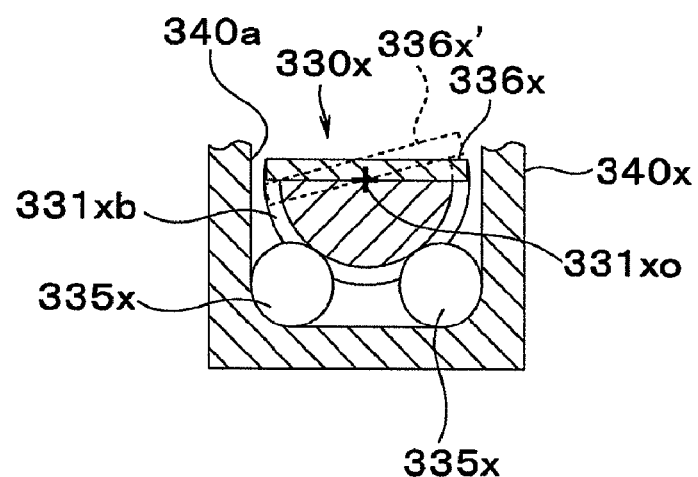
FIG. 18 is a view showing a rotational displacement state of a rod of an X-axis driving mechanism section shown in the sectional view taken along the line XII-XII in FIG. 9.
Figure 19:
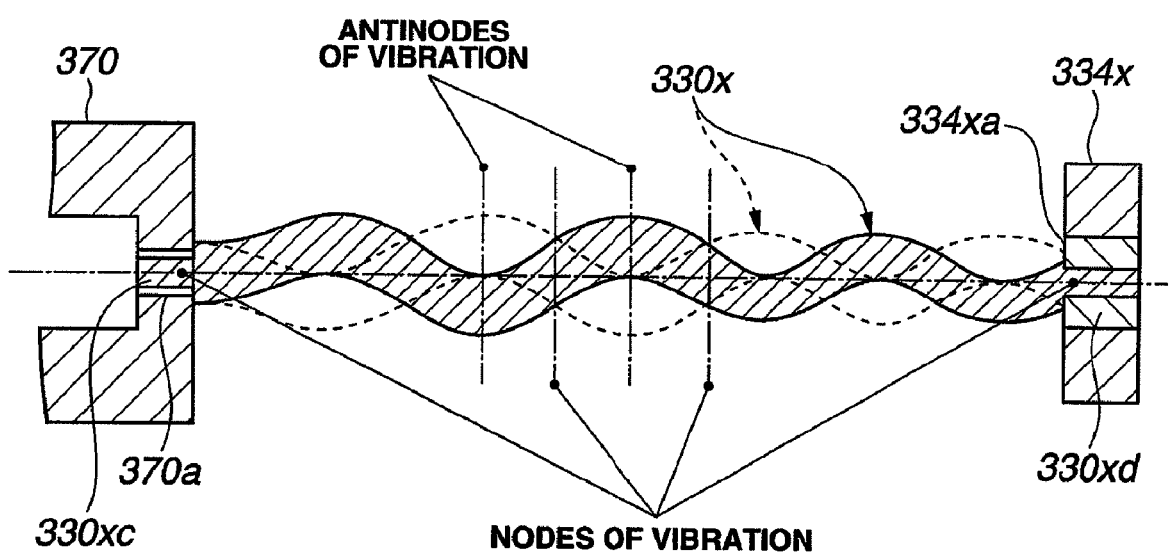
FIG. 19 is an enlarged conceptual diagram showing an amplitude when a rod is in a resonance state in the X-axis driving mechanism section in FIG. 8.

FIG. 13 is a sectional view taken along the line XIII-XIII in FIG. 7. FIG. 14 is a sectional view taken along the line XIV-XIV in FIG. 7. FIG. 15 is a sectional view taken along the line XV-XV or XV'-XV' in FIG. 7. FIG. 16 is a sectional view taken along the line XVI-XVI in FIG. 7. FIG. 17 is a sectional view taken along the line XVII-XVII in FIG. 7. FIG. 18 is a view showing a rotational displacement state of a rod shown in the sectional view taken along the line XII-XII in FIG. 9. FIG. 19 is an enlarged conceptual diagram showing an amplitude when a rod $330x$ is in a resonance state (the bending vibration) with a weight being fixed to an end portion.

In the shake correction unit 300, the holder 38 as a movable frame on which the image pickup unit 30 (FIG. 2) including the optical LPF 32, the anti-dust filter 33 and the CCD 31 as the image pickup device is mounted is a final target to be moved in the X direction and the Y direction.

The holder 38 is supported movably in the X and Y directions relative to a frame 302 as a fixing member by an X-axis driving mechanism section $310x$ and a Y-axis driving mechanism section $310y$ described later. The holder 38 is also position-restricted in the Z direction by holding a ball (A) 381, a ball (B) 382, and a ball (C) 383 as rolling bodies between the holder 38 and the frame 302 (FIGS. 14 and 15).

The shake correction unit 300 includes the X-axis driving mechanism section $310x$ as a first driving mechanism for displacing the holder 38 in the X direction relative to the frame 302, and the Y-axis driving mechanism section $310y$ as a second driving mechanism for displacing the holder 38 in the Y direction relative to the frame 302. By moving the holder 38 independently in the X and Y directions, the CCD 31 mounted on the holder 38 is driven and displaced in the X and Y directions in the XY plane to compensate for a shake.

Next, a configuration of the X-axis driving mechanism section $310x$ that forms an X-direction single-axis driving mechanism will be described in detail. The Y-axis driving mechanism section $310y$ that forms a Y-direction single-axis driving mechanism has the same basic structure as that of the X-axis driving mechanism section $310x$. The X-axis driving mechanism section $310x$ will be described in detail below. Respective components of the X-axis driving mechanism section $310x$ are assigned respective reference numerals with the suffix "x" attached, and respective components of the Y-axis driving mechanism section $310y$ corresponding to those of the X-axis driving mechanism section $310x$ are assigned the same reference numerals with the suffix "y" attached.

The X-axis driving mechanism section $310x$ includes a top case $360x$, an X-axis transducer $320x$ as a first transducer having a piezoelectric body $323x$ and drivers $321x$ and $322x$ as driving sections, a rod $330x$, as a first movable body that is movable in the X direction, having a rod body $331x$ and a sliding plate $336x$, an X-axis pressing mechanism $350x$ as a first pressing mechanism for urging the X-axis transducer $320x$ toward the sliding plate $336x$, and a bottom case $340x$ as a first holding member.

In the X-axis transducer $320x$, according to the operating principle of the transducer 200 described using FIGS. 4 to 6, a voltage of a predetermined frequency generated in a transducer driving circuit 64 (FIG. 1) is applied to the piezoelectric body $323x$ via a connecting FPC (a flexible printed circuit cable) $326x$, and an elliptical vibration is generated on the drivers $321x$ and $322x$ as the driving sections arranged on one surface of the rectangular piezoelectric body $323x$. A driving force in the X direction is obtained by the elliptical vibration occurring on the drivers $321x$ and $322x$.

In the X-axis transducer $320x$, a transducer holder $324x$ having a square-U shape is fixed to a center position of the piezoelectric body $323x$ on an opposite side from the drivers $321x$ and $322x$. The transducer holder $324x$ has protrusions $324xc$ formed at both sides, which are fitted into grooves $340xc$ as holding sections of the bottom case $340x$ as shown in FIGS. 8 and 10. Accordingly, movement of the X-axis transducer $320x$ in the X direction is restricted. Furthermore, side surfaces of the transducer holder $324x$ are fitted to inner walls $340xa$ of the bottom case $340x$, so that movement of the X-axis transducer $320x$ in the Y direction is restricted. The X-axis transducer $320x$ is held in the bottom case $340x$ in such a manner.

In the rod $330x$, the sliding plate $336x$ as a sliding section is fixed to a plane portion $331xa$ formed on the rod body $331x$ as a guided section having a substantially columnar shape as a whole but, to be exact, partly having a D-shaped section. The drivers $321x$ and $322x$ of the X-axis transducer $320x$ are pressed toward the rod $330x$, and are thereby in contact with the sliding plate $336x$. The sliding plate $336x$ may be fixed to the rod body $331x$ in any manner. The sliding plate $336x$ is fixed to the rod body $331x$ using an adhesive here, but may be also fixed using a screw. Furthermore, the sliding plate $336x$ may be also formed integrally with the rod body and fixed in any manner if the sliding plate $336x$ is made of a material having high rigidity and abrasion resistance. The rod body $331x$ is preferably made of stainless steel having high rigidity or quenched ferritic stainless steel. The sliding plate $336x$ is made of a material such as ceramics having abrasion resistance and high rigidity. The rod $330x$ is thereby increased in rigidity. By increasing the rigidity, the rod $330x$ as the movable body that is small and can output high power can be realized. The rod $330x$ also serves as a structure as described later, so that accuracy is further improved and a frame member can be further reduced in size.

The rod body $331x$ also holds four balls $335x$ as rolling bodies, two of which are fitted into each of two grooves $331xb$ having an arc shape, on an outer periphery of the rod body $331x$ on an opposite side from the plane portion $331xa$ to which the sliding plate $336x$ is fixed. The balls $335x$ are supported by side surfaces and a bottom surface of a U-shaped groove $340xf$ extending in the X direction in the bottom case $340x$, so that the X transducer $320x$ is pressed against the sliding plate $336x$. The rod body $331x$ is thereby positioned in a relatively movable manner in the X direction with respect to the bottom case $340x$. Meanwhile, the bottom case $340x$ is fixed to a top surface $302d$ of the frame 302 with screws $344x$. Thus, the rod $330x$ can be relatively moved in the X direction with respect to the frame 302 (FIG. 9).

The rolling bodies are not limited to the balls $335x$, and rollers may be employed. However, in the case of rollers, it is necessary to form inclined planes for receiving the rollers at two corners instead of the U-shaped groove $340xf$ extending in the X direction in the bottom case $340x$, and arrange the rollers between the inclined planes and the rod $330x$.

A weight $334x$ as a weight section is fixed to one end portion $330x$ d of the rod $330x$. A rod coupling body 370 which also serves as a weight is fixed to the other end portion $330xc$. The weight $334x$ and the rod coupling body 370 are made of stainless steel or steel material having the same density as the rod body $331x$, and more preferably, made of a material such as copper, brass, and tungsten having a higher density than the rod 330$x$. The weight 334$x$ is bonded to the end portion 330$x$ d of the rod body 331$x$ via a vibration absorbing member 334$xa$ made of a material having a vibration damping property such as rubber. The weight 334$x$ may be fixed to the rod body 331$x$ using another device such as a screw instead of bonding, or may be integrally formed with the rod body 331$x$.

The rod coupling body 370 is made of stainless steel or steel material having the same density as the rod body 331$x$, and more preferably, made of a material such as copper, brass, and tungsten having a higher density than the rod body 331$x$. The rod coupling body 370 is bonded to the end portion 330$xc$ of the rod body 331$x$ using a viscoelastic rubber adhesive having a vibration damping property. When the X-axis driving mechanism section 310$x$ is in a driving state, the rod 330$x$ is in a resonance state. The end portions of the rod 330$x$ to which the weight 334$x$ and the rod coupling body 370 are fixed correspond to node positions in the resonance state.

With the weight 334$x$ and the rod coupling body 370 being fixed to the end portions of the rod 330$x$ at the node positions in the resonance state, the vibration of the rod 330$x$ occurring when the X-axis transducer 320$x$ is operating can be reduced or eliminated. Accordingly, an unnecessary vibration is not generated, and stable driving with higher efficiency which produces no audible noise can be achieved. Further details will be described later with reference to FIGS. 19 and 30.

The X-axis pressing mechanism 350$x$ includes a leaf spring 352$x$ inserted into a top portion of the top case 360$x$, adjusting screws 354$x$ for pressing end portions of the leaf spring 352$x$, adjusting washers 353$x$ for adjusting an adjusting screw pressing amount, and threaded holes (threaded holes into which the screws are screwed) 360$x$ d arranged in the top case 360$x$.

The leaf spring 352$x$ is a substantially straight leaf spring that extends in the X direction and is elastically deformable as shown in FIGS. 8 and 10. The leaf spring 352$x$ has protrusions 352$xb$ projecting in a width direction at both ends, and positioning protrusions 352$xc$ projecting in the width direction in a center. When the leaf spring 352$x$ is inserted into the top portion of the top case 360$x$, the protrusions 352$xb$ at the both ends are fitted to inner walls 360$xa$ of the top case 360$x$, so as to effect positioning in the Y direction and restrict rotation. The positioning protrusions 352$xc$ are further fitted into top cutouts 360$xc$ of the top case 360$x$, so as to effect positioning in the X direction.

The two adjusting screws 354$x$ are screwed into the threaded holes 360$x$ d of the top case 360$x$ with the adjusting washers 353$x$ being interposed therebetween, so that the both end portions of the leaf spring 352$x$ that is symmetric in the X direction are pressed downward by tips of the screws. An anti-vibration sheet 351$x$ made of a vibration absorbing material such as rubber is formed in the center of a bottom surface of the leaf spring 352$x$. When the both end portions of the leaf spring 352$x$ are pressed and displaced, a protruding pressing section 324$xb$ of the transducer holder 324$x$ on the X-axis transducer 320$x$ side is pressed by a pressing section in the center of the bottom surface of the leaf spring via the anti-vibration sheet 351$x$. The transducer holder 324$x$ presses the X-axis transducer 320$x$. By a pressing force, the drivers 321$x$ and 322$x$ of the X-axis transducer 320$x$ are brought into abutment with the sliding plate 336$x$.

Since a pressing displacement amount of the leaf spring 352$x$ is changed by changing thickness of the adjusting washers 353$x$, the pressing force against the transducer can be adjusted. The pressing force of the X-axis pressing mechanism 350$x$ against the transducer is set to about 15 N (Newton), which is considerably high.

The top case 360$x$ has an inverse U shape, and includes four rectangular holes 360$xb$, two of which are arranged in each of both descending side surfaces at both ends in the X direction. Meanwhile, the bottom case 340$x$ includes protrusions 340$xb$ at positions respectively corresponding to the rectangular holes 360$xb$ (FIGS. 8 and 9). The top case 360$x$ and the bottom case 340$x$ are put together by fitting inner wall surfaces of the top case 360$x$ to outer surfaces of the bottom case 340$x$ with the leaf spring 352$x$, the X-axis transducer 320$x$ and the like being incorporated therein. When the top case rectangular holes 360$xb$ and the protrusions 340$xb$ are engaged together (FIG. 11), a relative position of the top case 360$x$ with respect to the bottom case 340$x$ is determined.

Also, cutouts 360$xe$ and cutouts 340$xe$ are respectively provided in a side surface of the top case 360$x$ and a side surface of the bottom case 340$x$ (FIG. 8). The connecting FPC 326$x$ connected to a top surface of the X-axis transducer 320$x$ is to be inserted through the cutouts when the top and bottom cases are put together as described above.

The Y-axis driving mechanism section 310$y$ has the same basic structure as that of the X-axis driving mechanism section 310$x$ (see FIG. 13), and a detailed description thereof is omitted here. The top and bottom cases 360$x$ and 340$x$, and the X-axis transducer 320$x$ of the X-axis driving mechanism section 30$x$ are members to be fixed to the frame 302, and the rod 330$x$ as the movable body is moved in the X direction by the driving force of the X-axis transducer 320$x$. On the other hand, in the Y-axis driving mechanism section 310$y$, a rod 330$y$ as a second movable body is a member to be fixed to the frame 302 in the Y-axis moving direction. A Y-axis transducer 320$y$ as a second transducer having drivers 321$y$ and 322$y$, a bottom case 340$y$ as a second holding member, a Y-axis pressing mechanism 350$y$ as a second pressing mechanism, and a top case 360$y$ are members to be moved. Thus, the holder 38 fixed to the bottom case 340$y$ is also a member to be moved.

The rod 330$x$ and the rod 330$y$ are bonded to the rod coupling body 370 as a coupling body with their end portions being fitted into holes 370$a$ and 370$b$ of the rod coupling body 370, and are supported such that their center axes perpendicularly intersect with each other. Therefore, when the rod 330$x$ is driven in the X direction by the X-axis driving mechanism section 310$x$, the rod 330$y$ coupled to the rod 330$x$ via the rod coupling body 370 is also moved in the X direction integrally with the rod 330$x$. The top and bottom cases 360$y$ and 340$y$ press-supported on the rod 330$y$, and the holder 38 to which the bottom case 340$y$ is fixed are also moved in the X direction. When the rod 330$y$ is relatively driven by the Y-axis driving mechanism section 310$y$, the holder 38 is moved in the Y direction.

The rod 330$x$ is rotatable about a center of a cylindrical plane of the groove 331$xb$ (an axis center 330$x$O of rotation of the rod 330$x$) relative to the bottom case 340$x$ as shown by the dash line in FIG. 18 (a position of a sliding plate 336$x'$). The rod 330$y$ coupled to the rod 330$x$ via the rod coupling body 370 is also integrally rotatable. The rod 330$y$ is press-supported on the bottom case 340$y$ via balls 335$y$. The bottom case 340$y$ is fixed to the holder 38 with screws 344$y$. The holder 38 is rotatable about the axis center of the rod 330$x$ integrally with the rod 330$y$.

As shown in FIGS. 7 and 14, the holder 38 is held with an axis center of the rod 330$y$ corresponding to a center of the ball (A) 381 arranged in a ball receiver 302$a$ of the frame 302. The axis center of the rod 330$y$ is maintained parallel to a plane of the ball receiver 302$a$ of the frame 302 in a state in which rotation of the rod 330$y$ about the axis center of the rod 330$x$ is prevented by the ball (A) 381.

In the Y-axis driving mechanism section 310y, rotation about the axis center of the rod 330y is also possible. Since the rod 330y is press-supported on the bottom case 340y via the balls 335y and the bottom case 340y is fixed to the holder 38 with the screws 344y, the holder 38 is rotatable about the axis center of the rod 330y. Thus, a ball receiver 302b of the frame 302 is provided at a position apart from the center axis of the rod 330y, for example, at a position passing through a center of the CCD 31 on an extended line of the rod coupling body 370 and the ball (C) 383 that is located near the engagement body, and the ball (B) 382 for receiving the holder 38 is arranged in the ball receiver 302b. The rotation of the holder 38 about the axis center of the rod 330y is thereby restricted (FIGS. 7 and 15).

Since the bottom case 340x that positions the rod 330x is fixed to the frame 302, a position of the rod 330x in the Z direction relative to the frame 302 is determined. The holder 38 is supported by the ball (A) 381 and the ball (B) 382 arranged on the frame 302. Accordingly, the holder 38 is slidably supported by maintaining a state in which a mounting surface of the CCD 31 is parallel to the XY plane at an accurate position in the Z direction.

The ball (C) 383 interposed between a ball receiver 302c of the frame 302 and the holder 38 is arranged at a position near an intersection of the axis centers of the rod 330x and the rod 330y (the position of the rod coupling body 370). The ball (C) 383 secondarily supports the holder 38 such that the holder 38 is not inclined in a case where an abnormal rotational force is applied to the holder 38 due to an abnormal load or the like occurring when the holder 38 is moved in the X and Y directions (FIGS. 7 and 15). However, the ball (C) 383 is not necessarily required when supporting the holder 38.

The ball (A) 381, the ball (B) 382, and the ball (C) 383 have the same diameter. Receiving surfaces of the three ball receivers 302a, 302b and 302c are on the same plane with each other, and opposing three recessed receiving surfaces 38a of the holder 38 are on the same plane with each other. Therefore, the holder 38 is maintained parallel to the frame 302.

As shown in FIG. 16, arms are formed at positions opposing to each other on outer peripheral portions of the holder 38 and the frame 302. Spring hooks 38e and 302e as V-shaped cutouts are respectively formed at top end portions of the arms, and a spring 384 as an urging section is suspended. An urging force of the spring 384 acts as a moment about the rod 330x on the holder 38. Also, the force acts to hold the ball (A) 381 and the ball (B) 382, so that the holder 38 and the frame 302 are stably maintained parallel to each other. Since the urging force of the urging spring 384 becomes load at the time of driving operation, the urging force is set to be sufficiently smaller than the pressing forces of the X-axis transducer 320x and the Y-axis transducer 320y. Since the force acts at a position apart from the center axes of the rod 330x and the rod 330y, a sufficiently large moment is obtained.

A holder supporting structure in which the ball (B) 382 out of the three balls held between the frame 302 and the holder 38 in the shake correction unit 300 is located on an extended line of the rod 330x or at a position apart a predetermined distance from the rod 330y toward the CCD 31 may be also employed. In this case, the ball (C) 383 may be provided, but is not necessarily required. According to the supporting structure, both the rotation of the rod 330x and the rotation of the rod 330y are effectively restricted, and the holder 38 can be stably supported on the frame 302.

As described above, the weight 334x is fixed to one end portion 330x d of the rod 330x via the vibration absorbing member 334xa, and the rod coupling body 370 which also serves as a weight is bonded to the other end portion 330xc with the adhesive with a good vibration damping property in the hole 370a. Similarly, a weight 334y as a weight section is fixed to one end portion 330yd of the rod 330y, and the rod coupling body 370 which also serves as a weight is fixed to the other end portion 330yc. The rod 330x and the rod 330y are integrated via the rod coupling body 370.

Ultrasound elliptical vibrations are directly transmitted to the rod 330x and the rod 330y by operation of the X-axis transducer 320x and the Y-axis transducer 320y. The vibrations transmitted to the rod 330x and the rod 330y resonate in the respective rods, so that a vibration state as shown in FIG. 19 is obtained. Although only a bending vibration state is enlargedly shown in FIG. 19, various vibrations such as a torsion vibration and a longitudinal vibration are also generated.

The rod coupling body 370 is fixed at the node position of the vibration of the rod 330x. The same applies to the rod 330y. If the rod coupling body 370 is fixed at a position of antinode having a maximum amplitude, the entire vibration of the X-axis driving mechanism section 310x or the Y-axis driving mechanism section 310y is inhibited, and the X-axis driving mechanism section 310x or the Y-axis driving mechanism section 310y is decreased in output. Furthermore, an unnecessary vibration is transmitted from one axis driving mechanism section to the other axis driving mechanism section, and the other axis driving mechanism section is also decreased in output.

Accordingly, by coupling the rod coupling body 370 with the adhesive at the node position of the resonance vibration occurring on the respective rods when moved at diving frequencies of the transducers 320x and 320y as described above, the decrease in output is suppressed. In FIG. 19, the vibration amplitude is significantly enlarged. Since deformation of the adhesive occurs at a level of smaller than 1 μm, vibration energy loss is not large.

Figure 30:
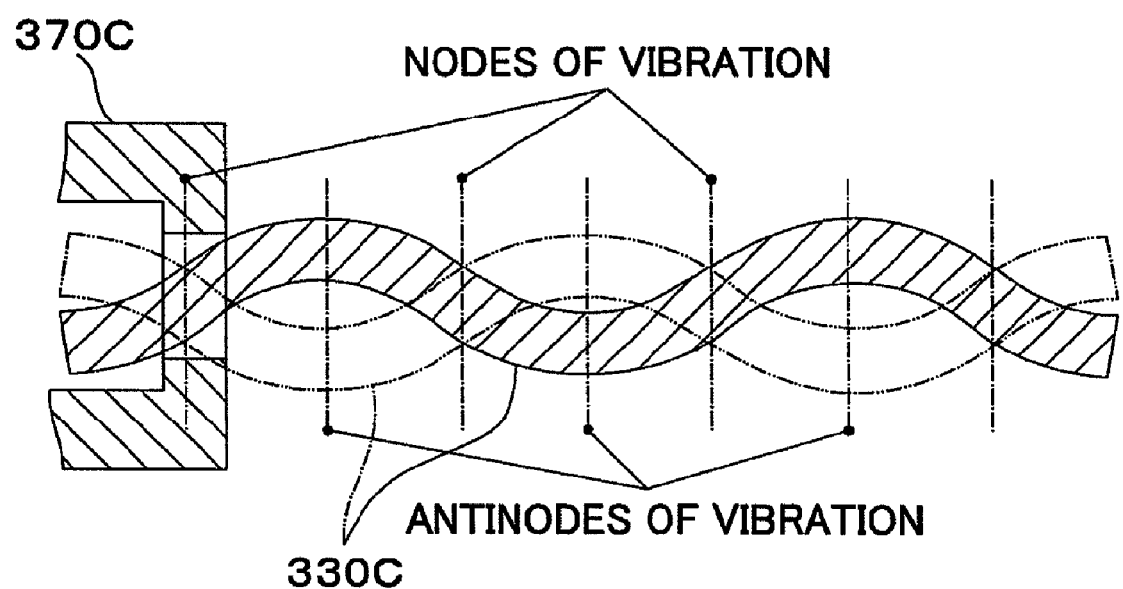
FIG. 30 is an enlarged conceptual diagram showing an amplitude when a rod is in a resonance state in a conventional driving mechanism section.

Furthermore, by respectively fixing the weights 334x and 334y to the end portions 330x d and 330yd of the rods 330x and 330y on the opposite sides from the rod coupling body 370 via the vibration absorbing member 334xa (FIG. 7), the rod coupling body 370 and the end portions correspond to the node positions of the vibration in the resonance state, so that the amplitude is suppressed. If the weights are not mounted on the end portions, a bending vibration having a large amplitude as shown in FIG. 30 showing a resonance state of a rod 330C is generated, which causes output decrease and audible noise.

However, by fixing the weights 334x and 334y to the end portions of the rods 330x and 330y as shown in FIG. 19, the vibration has a shortened wavelength, and the resonance frequency is higher. Accordingly, when the transducers 320x and 320y are driven at the driving frequencies, the rods 330x and 330y are difficult to resonate and the amplitude is suppressed. Even when the transducer is made to vibrate at a frequency near the resonance frequency, the amplitude can be also suppressed. Therefore, the vibration of the transducer is not leaked via the rod, and driving efficiency is improved. Also, a stable vibration state is obtained, and no audible noise occurs.

A weight having a minimum mass is applied by adjusting masses of the fixed weights 334x and 334y according to respective vibration characteristics of the X-axis driving mechanism section 310x and the Y-axis driving mechanism section 310y. Accordingly, the driving apparatus which is small and has optimum vibration characteristics is obtained.

End surfaces of the weights 334x and 334y and the rod coupling body 370 also serve as stoppers for restricting an area in which the rods 330x and 330y are moved by butting against side surfaces of the bottom cases 340x and 340y as moving amount restriction sections when the rods 330x and 330y are moved in the driving directions.

Next, each control element and its control operation in the shake correction unit 300 will be described. An X-axis gyroscope 62x as a shake detector for detecting a shake about the X axis (a shake in the pitch direction) of the body unit 100, and a Y-axis gyroscope 62y as a shake detector for detecting a shake about the Y axis (a shake in the yaw direction) of the body unit 100 are incorporated in the body unit 100 of the camera (FIG. 1). A position detecting sensor 390 including a hall device 392 provided on a flexible printed circuit 391 mounted on the frame 302 and a magnet 393 provided at a portion of the holder 38 to oppose the hall device 392 is also incorporated in the body unit 100 (FIGS. 1 and 7). The body unit 100 further includes a shake correction control circuit 61 for controlling the transducer driving circuit 64 that drives the X-axis transducer 320x and the Y-axis transducer 320y based on signals from the X-axis gyroscope 62x, the Y-axis gyroscope 62y and the position detecting sensor 390. The shake correction control circuit 61 executes control operation in accordance with a command from the Bμcom 50.

In the X-axis driving mechanism section 310x, the drivers 321x and 322x of the X-axis transducer 320x are in pressure contact with the sliding plate 336x by a high urging force by the X-axis pressing mechanism 350x. Thus, when a voltage of a predetermined frequency is applied to the X-axis transducer 320x to generate elliptical vibrations on the drivers 321x and 322x, the rod 330x is driven in the rotational direction of the elliptical vibrations of the drivers 321x and 322x.

Here, the pressing force applied to the X-axis transducer 320x is high. Thus, if the sliding plate 336x or the rod body 331x constituting the rod 330x has low rigidity, the sliding plate 336x or the rod body 331x is bent by the applied pressing force, and the drivers 321x and 322x contact the sliding plate 336x only at one side. Thus, operation may become unstable or may be stopped.

However, in the shake correction unit 300 according to the present embodiment, the sliding plate 336x and the rod body 331x constituting the rod 330x have high rigidity. Therefore, a pressure contact state between the drivers 321x and 322x and the sliding plate 336x becomes stable, and the driving force of the elliptical vibrations is reliably transmitted to the sliding plate 336x, so that the rod 330x can be efficiently driven in the rotational direction of the elliptical vibrations. Also, the rod 330x having the sliding plate 336x is not in surface contact with the bottom case 340x, but in rolling contact with the bottom case 340x using the balls 335x held in the grooves 331xb of the rod body 331x. Accordingly, even if the high pressing force is applied, small friction is generated, and the rod 330x is reliably moved relative to the bottom case 340x.

Furthermore, since the rod body 331x has a ball bearing structure having balls arranged in two rows in the X direction, the rod 330x is moved only in the X direction when driven by the X-axis transducer 320x. When the rod 330x is moved, the rod 330y perpendicularly fixed to one end of the rod 330x via the rod coupling body 370 is integrally moved in the X direction. The bottom case 340y is positioned relative to the rod 330y via the balls 335y arranged in two rows in the Y direction by pressing the Y-axis transducer 320y by the Y-axis pressing mechanism 350y, and the bottom case 340y is fixed to the holder 38 with the screws 344y. Therefore, when the rod 330x is moved in the X direction, the holder 38 is also moved in the X direction integrally with the rod 330x. That is, a moving direction of the holder 38 is also guided by engagement between the rod body 331x having the ball bearing structure having the balls arranged in two rows in the X direction and the bottom case 340x. By employing such a structure, the apparatus can be reduced in size and simplified in structure.

As described above, the rod 330x can rotate through a small angle relative to the bottom case 340x (FIG. 18). If the rod 330x rotates as shown in FIG. 18, the drivers 321x and 322x of the X-axis transducer 320x contact the sliding plate 336x only at one side, and transmission efficiency of the driving force could be decreased. In the present embodiment, however, the transducer holder 324x of the X-axis transducer has the protrusion 324xb with a narrow contact surface with the leaf spring 352x, and thus, the X-axis transducer 320x can be inclined a little. The contact at one side can be thereby prevented.

Next, camera shake correction operation in the shake correction unit 300 will be described. When an unillustrated main SW (switch) is turned ON while an unillustrated camera shake correction SW in the camera operation SW 52 is ON, the Bμcom 50 transmits a signal to instruct the transducer driving circuit 64 to execute initial operation to the shake correction control circuit 61. The transducer driving circuit 64 applies a voltage of a predetermined frequency to the X-axis transducer 320x and the Y-axis transducer 320y, and the holder 38 is driven in the X and Y directions such that the image pickup optical axis OC that is the center of the CCD 31 is moved to a central position corresponding to the photographing lens optical axis OL.

At the time of photographing, signals indicative of a shake of the body unit 100 detected by the X-axis gyroscope 62x and the Y-axis gyroscope 62y are amplified in a processing circuit, A/D-converted, and then, inputted to the shake correction control circuit 61.

The shake correction control circuit 61 calculates a shake correction amount based on the output signals of the X-axis gyroscope 62x and the Y-axis gyroscope 62y, and outputs a signal corresponding to the calculated shake correction amount to the transducer driving circuit 64. The holder 38 on which the CCD 31 is mounted is driven by the Y-axis transducer 320y and the X-axis transducer 320x operating based on electrical signals generated by the transducer driving circuit 64. A driven position of the holder 38 on which the CCD 31 is mounted is detected by the position detecting sensor 390, transmitted to the shake correction control circuit 61, and feedback-controlled.

That is, the shake correction control circuit 61 calculates a reference value based on the signals (referred to as "shake signal" or "shake angular velocity signal" below) inputted from the X-axis gyroscope 62x and the Y-axis gyroscope 62y. The calculation of the reference value is performed during a period from turning-ON of a main power supply of the camera until exposure for photographing a still image. The reference value may be calculated in any method, such as a method of calculating an average movement value of the shake signal for a relatively long period of time and a method of calculating a DC component using a low-pass filter having a relatively low cut-off frequency. By subtracting the reference value obtained by the above calculation from the shake signal, a signal from which a low frequency component of the shake signal is removed is obtained. The transducer driving circuit 64 is controlled based on the above signal and the output signal of the position detecting sensor 390, so as to move the holder 38 on which the CCD 31 is mounted to compensate for the shake.

Figure 20:
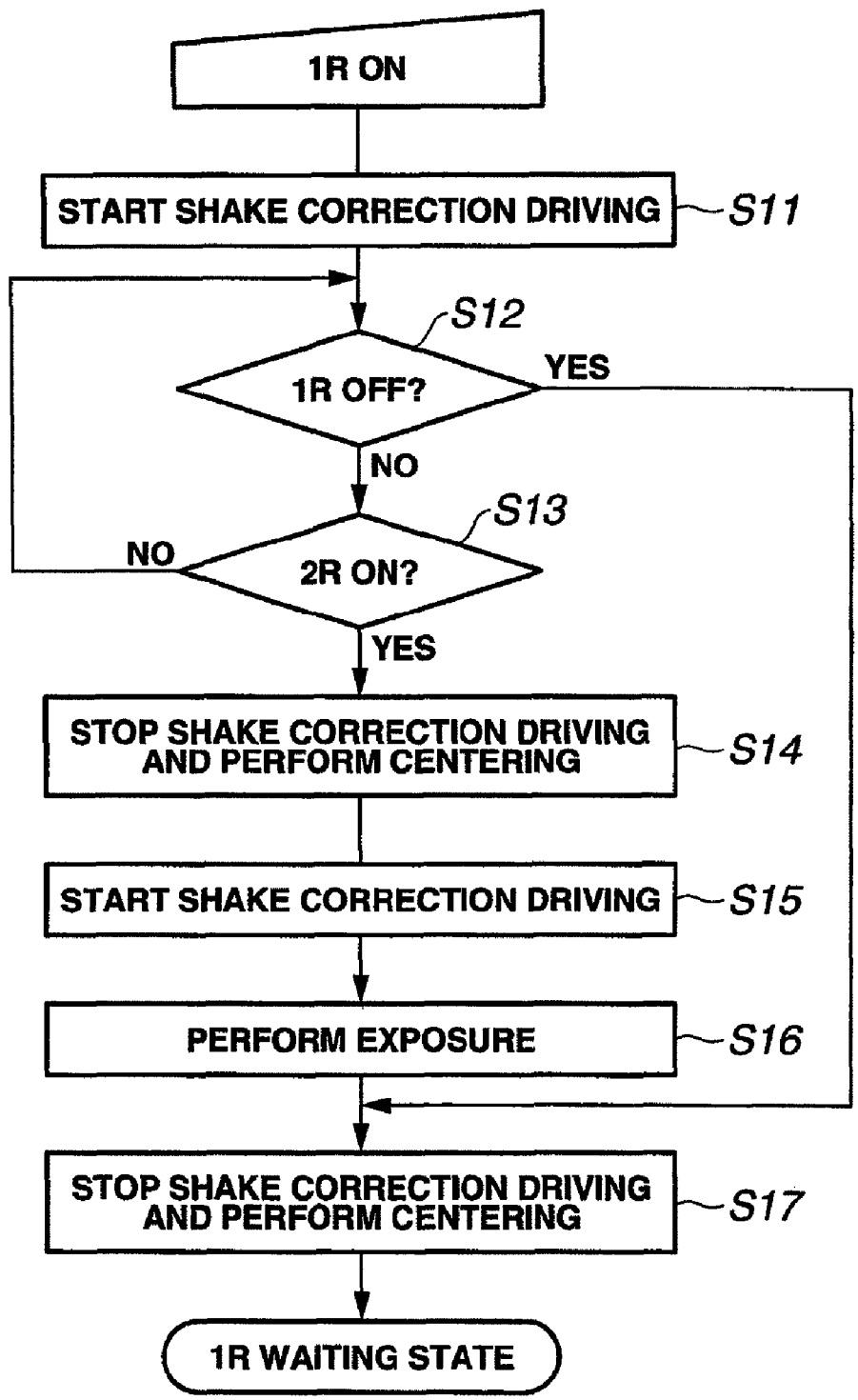
FIG. 20 is a schematic flowchart showing shake correction operation at the time of photographing a still image in the camera in FIG. 1.

Next, photographing processing operation including the aforementioned camera shake correction operation at the time of photographing a still image will be described with reference to the flowchart of FIG. 20. FIG. 20 is a schematic flowchart showing the camera shake correction operation at the time of photographing a still image. The processing operation is executed under control of the Bµcom 50. The processing operation is not performed before photographing preparation start is instructed by the release SW (before 1R-ON that is first stage release operation), and is started when the photographing preparation start is instructed by the release SW (after 1R-ON).

When the processing operation is started by the 1R-ON operation of the release SW, the correction amount is calculated by using the aforementioned reference value, and shake correction driving is started according to the calculated correction amount (step S11). Subsequently, it is determined whether or not the instruction of photographing preparation start by the release SW is canceled (1R-OFF or not) (step S12). When it is determined that the instruction is canceled (YES in step S12), the shake correction driving started in step S11 is stopped and the CCD 31 is centered (step S17), so that a state in which the instruction of photographing preparation start is waited for (1R waiting state) is obtained.

On the other hand, when it is determined that the instruction of photographing preparation start by the release SW is not canceled (NO in step S12), it is then determined whether or not photographing start is instructed by the release SW (2R-ON or not) (step S13). When it is determined that the photographing start is not instructed (NO in step S13), the process returns to step S12, to wait in an instruction waiting state.

On the other hand, when it is determined that the photographing start is instructed by the release SW (YES in step S13), the shake correction driving started in step S11 is stopped and the CCD 31 is centered (step S14). Subsequently, the correction amount is calculated using the stored reference value, and the shake correction driving is started in accordance with the correction amount (step S15).

Thereafter, exposure is performed (step S16). When the exposure is completed, the shake correction driving is stopped and the CCD 31 is centered (step S17), so that a state in which the instruction of photographing preparation start is waited for (1R waiting state) is obtained.

As described above, in the shake correction unit 300 of the camera according to the present embodiment, the X-axis driving mechanism section and the Y-axis driving mechanism section respectively use the transducers 320$x$ and 320$y$, which generate the elliptical vibrations by which a large driving force is easily obtained with high efficiency, as the driving sources, and have the rods 330$x$ and 330$y$ as the movable bodies having high rigidity. The X-axis driving mechanism section and the Y-axis driving mechanism section constitute a two-dimensional driving apparatus capable of driving the movable bodies in the X and Y directions with a simple structure in which the rods 330$x$ and 330$y$ are perpendicularly coupled to each other using the rod coupling body 370. Accordingly, the entire shake correction unit 300 can produce a large driving force with high efficiency, and enables the camera to be reduced in size and weight. Also, since the X-axis driving mechanism section and the Y-axis driving mechanism section as described above are employed, the shake correction unit 300 can retain the positions of the movable bodies, and has high responsiveness with high accuracy. Furthermore, since the holder 38 for holding the CCD 31 is moved by the aforementioned rods perpendicularly intersecting with each other, the shake correction unit 300 occupies a smaller space in the Z direction than a unit to which a link mechanism is applied, so that the camera can be reduced in thickness.

Since the weights 334$x$ and 334$y$ are respectively fixed to the end portions of the rods 330$x$ and 330$y$ and the rods 330$x$ and 330$y$ are coupled together by the rod coupling body 370, the resonance vibrations of the rods 330$x$ and 330$y$ occurring when driven by the transducers 320$x$ and 320$y$ can be suppressed. Accordingly, a highly efficient driving state is obtained, and audible noise can be prevented from occurring.

Figure 21:
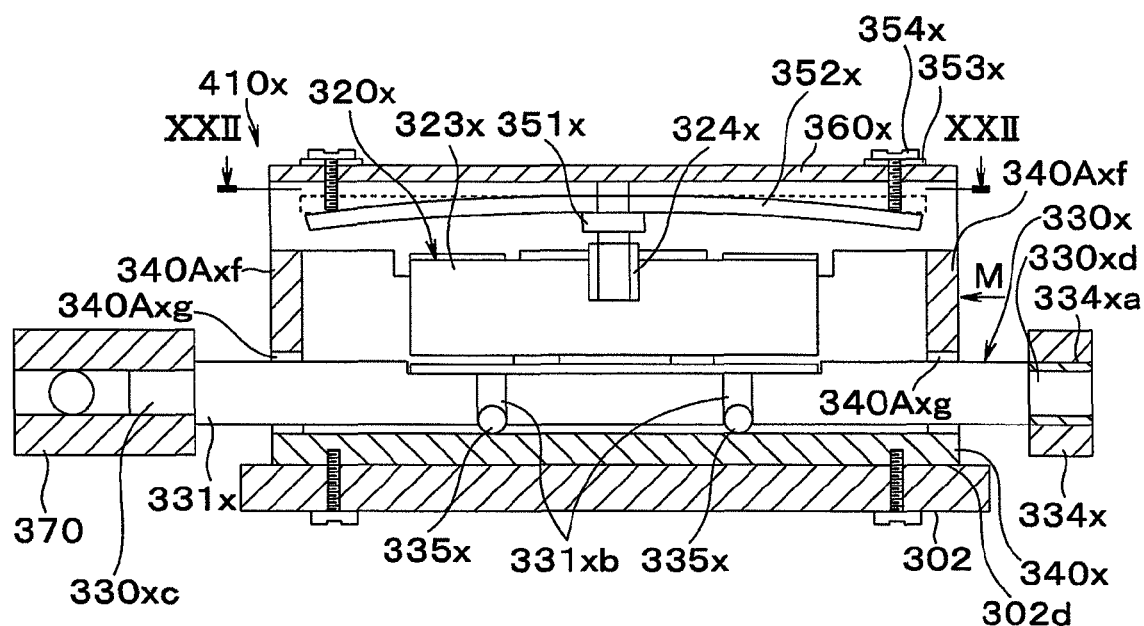
FIG. 21 is a sectional view of an X-axis driving mechanism section corresponding to FIG. 9 when a modification of a bottom case is applied to the X-axis driving mechanism section of the shake correction unit according to the aforementioned embodiment.
Figure 22:
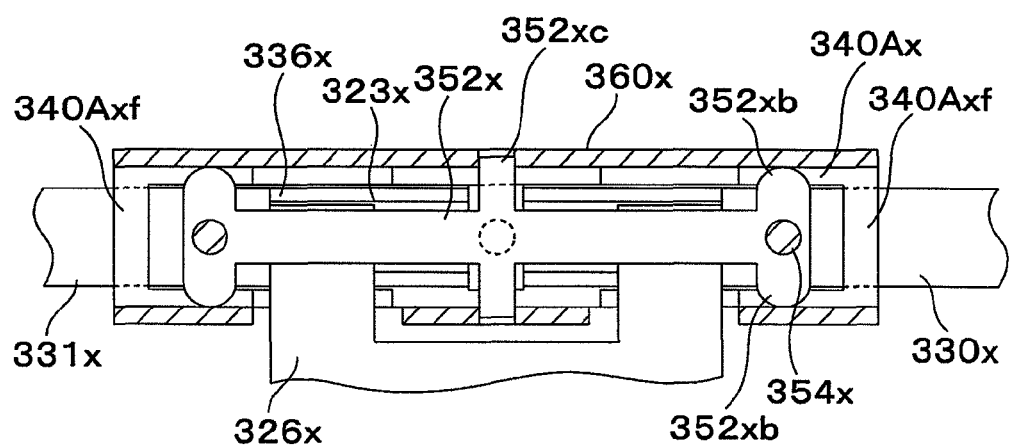
FIG. 22 is a sectional view taken along the line XXII-XXII in FIG. 21.
Figure 23:
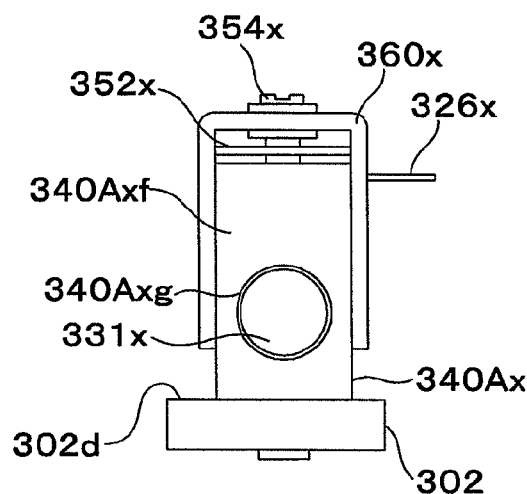
FIG. 23 is a view on the arrow M in FIG. 21.

Next, a modification of the bottom case applied to the driving mechanism of the shake correction unit 300 in the aforementioned embodiment will be described with reference to FIGS. 21 to 23. FIG. 21 is a sectional view of an X-axis driving mechanism section corresponding to FIG. 9 when a bottom case according to the present modification is applied. FIG. 22 is a sectional view taken along the line XXII-XXII in FIG. 21. FIG. 23 is a view on the arrow M in FIG. 21.

A bottom case 340Ax according to the present modification includes wall sections 340Axf at both end portions in the X direction that is the driving direction. The wall sections 340Axf have through holes Axg slightly larger than the rod body 331$x$ of the rod 330$x$, through which the rod body 331$x$ penetrates.

The X-axis transducer 320$x$, the X-axis pressing mechanism 350$x$, the top case 360$x$ or the like incorporated in an X-axis driving mechanism section 310Ax to which the bottom case 340Ax is applied are the same as those in the aforementioned embodiment, and operate in the same manner as those of the X-axis driving mechanism section 310$x$. The same components are assigned the same reference numerals in the drawings.

Since the bottom case 340Ax according to the present modification has the wall sections 340Axf, the bottom case 340Ax has higher rigidity, and the driving force of the transducer is more efficiently transmitted. The bottom case 340Ax can be also reduced in thickness and weight.

The bottom case having the above structure can be also applied to the Y-axis driving mechanism section 310$y$. Accordingly, a highly-efficient small shake correction unit can be realized by coupling the rod 330$x$ and the rod 330$y$ using the rod coupling body 370 in a similar manner to the aforementioned embodiment.

In the X-axis driving mechanism section to which the bottom case of the present modification is applied, the weight 334$x$ is also fixed to the end portion 330$x$d of the rod 330$x$ via the vibration absorbing member 334$xa$ and the rod coupling body 370 is also fixed to the other end portion 330$xc$ in a similar manner to the aforementioned embodiment. The weight 334$x$ may be also integrally formed with the rod 330$x$, so that the number of components can be reduced. The weight and the rod coupling body are similarly fixed in the Y-axis driving mechanism section to which the bottom case of the present modification is applied, so that the same effect can be obtained.

Figure 24:
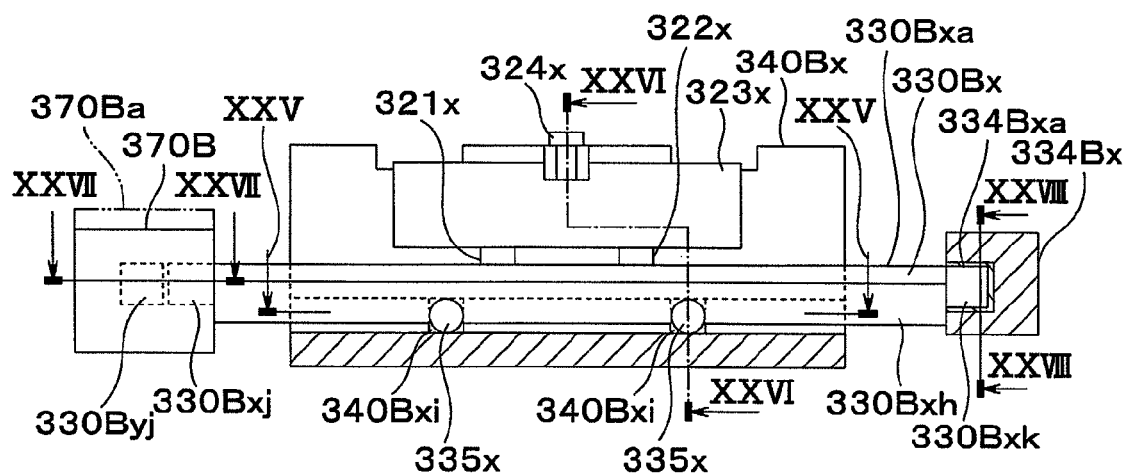
FIG. 24 is a sectional view of an X-axis driving mechanism section corresponding to FIG. 9 when a modification of a rod is applied to the X-axis driving mechanism section of the shake correction unit according to the aforementioned embodiment.
Figure 25:
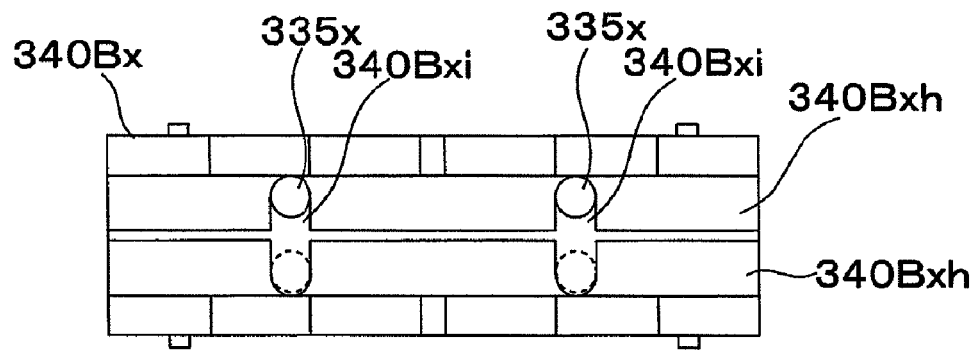
FIG. 25 is a view of a bottom portion of a bottom case of the X-axis driving mechanism section to which the modification of the rod in FIG. 24 is applied, as viewed from the line XXV-XXV in FIG. 24.
Figure 26:
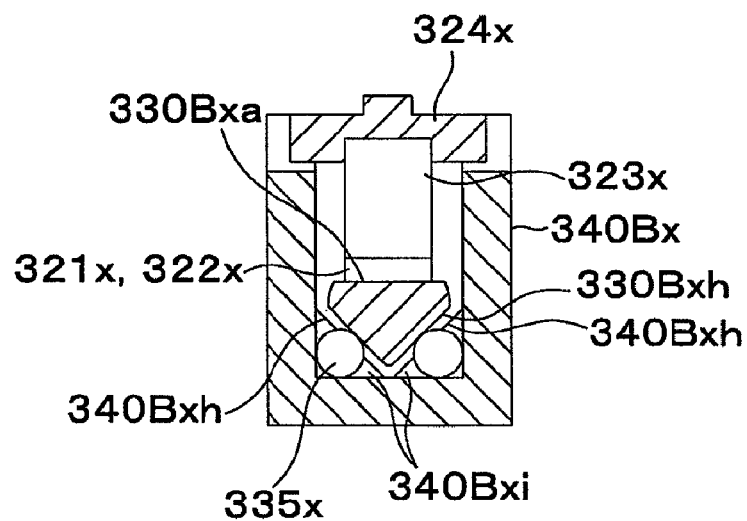
FIG. 26 is a sectional view taken along the line XXVI-XXVI in FIG. 24.
Figure 27:
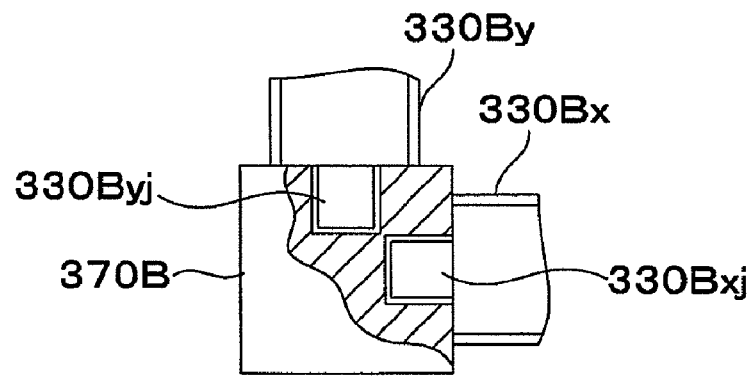
FIG. 27 is a sectional view taken along the line XXVII-XXVII in FIG. 24.
Figure 28:
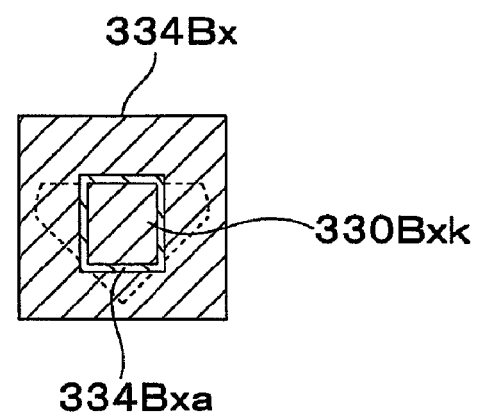
FIG. 28 is a sectional view taken along the line XXVIII-XXVIII in FIG. 24.
Figure 29:
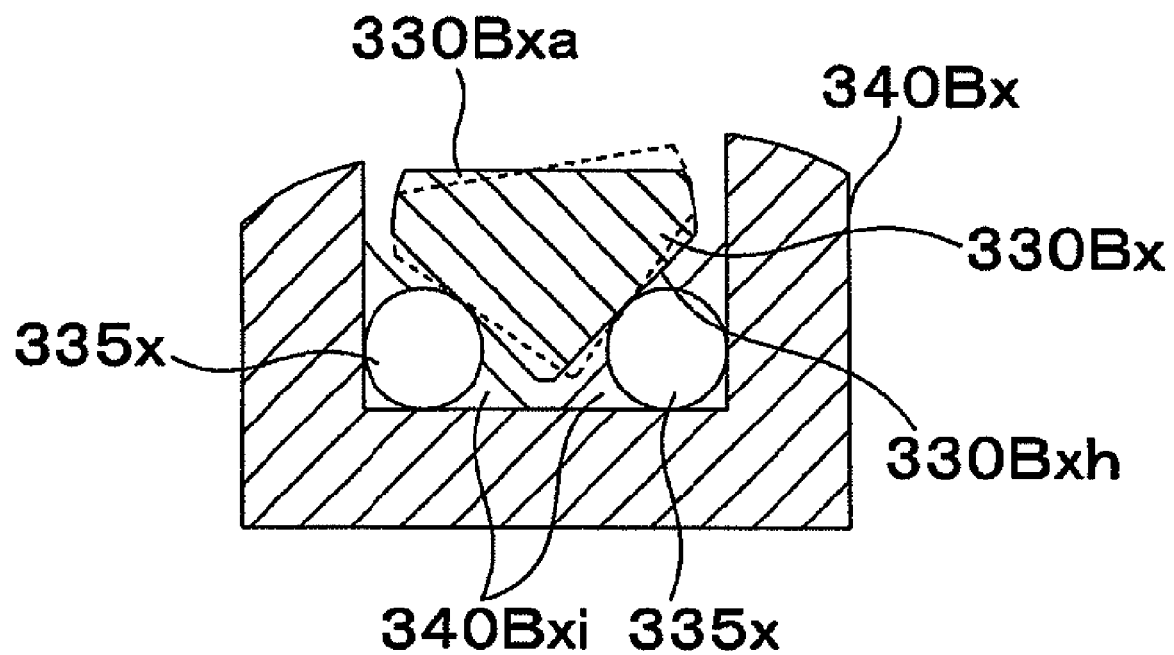
FIG. 29 is an enlarged view of the rod in the sectional view of FIG. 26, where a rotational force is applied to the rod.

Next, a modification of the rod of the driving mechanism section of the shake correction unit 300 in the aforementioned embodiment will be described with reference to FIGS. 24 and 29. FIG. 24 is a sectional view of an X-axis driving mechanism section corresponding to FIG. 9 when a rod according to the present modification is applied. FIG. 25 is a view of a bottom portion of a bottom case of the X-axis driving mechanism section to which the present modification is applied, as viewed from the line XXV-XXV in FIG. 24. FIG. 26 is a sectional view taken along the line XXVI-XXVI in FIG. 24. FIG. 27 is a sectional view taken along the line XXVII-XXVII in FIG. 24. FIG. 28 is a sectional view taken along the line XXVIII-XXVIII in FIG. 24. FIG. 29 is an enlarged view of the rod in the sectional view of FIG. 26, where a rotational force is applied to the rod.

A rod 330Bx of the X-axis driving mechanism section according to the present modification has a substantially isosceles triangle shape in section as shown in FIG. 26. The rod 330Bx is supported by the four balls 335x in two rows in the X direction in contact with isosceles surfaces 330Bxh. The balls 335x are held in grooves 340Bxi provided perpendicular to the X direction on a bottom case 340Bx. And, the sliding plate is not provided in the rod 330Bx unlike the aforementioned embodiment. Instead of the sliding plate, a surface with which the drivers 321x and 322x are in contact is processed to have abrasion resistance such as coating with ceramics, and has sufficient durability. Also, rotation of the rod 330Bx relative to the bottom case 340Bx can be restricted within a given range (FIG. 29).

A rod coupling body 370B and a weight 334Bx are respectively bonded to end portions 330Bxj and 330Bxk of the rod 330Bx in a similar manner to the rod 330x in the aforementioned embodiment (FIGS. 24, 27 and 28).

The weight 334Bx has a square pillar shape, and is made of stainless steel or steel material having the same density as the rod 330Bx, and more preferably, made of a material having a higher density than the rod 330Bx such as copper, brass, and tungsten. The weight 334Bx is bonded to the rod 330Bx by an adhesive. An adhesive 334Bxa has a viscoelastic property such as rubber and also preferably has a vibration damping property. The weight 334Bx may be also fixed to the rod 330Bx using another member such as a screw. Since the weight 334Bx has a square pillar shape, the weight 334Bx can be changed in mass while occupying substantially the same space, which enables size reduction. Meanwhile, the rod coupling body 370B is made of the same material and is bonded using the same adhesive as the weight 334Bx. The weight 334Bx may be also integrally formed with the rod 330Bx, so that the number of components and the number of assembling man-hours can be reduced.

It is necessary to balance the mass of the weight 334Bx and the mass of the rod coupling body 370B in order to suppress the resonance of the rod 330Bx. In this case, an adjusting weight 370Ba having an appropriate mass may be bonded to a top surface of the rod coupling body 370B instead of changing the mass of the weight 334Bx (FIG. 24). The adjusting weight 370Ba is most preferably made of a tungsten plate or a rubber material on which tungsten powder is spread, but may be also made of copper or iron having a high density, or alloy thereof. Another member such as a screw may be also used to fix the adjusting weight 370Ba to the rod coupling body 370B instead of bonding.

The same weight and rod coupling body as those of the rod 330x are fixed to the rod 330y of the Y-axis driving mechanism section.

When the rod 330Bx according to the present modification is applied, the rod itself has a simple structure and is easily assembled, so that the driving mechanism is improved in durability. By fixing the weights and the rod coupling body to the rods 330x and 330y, the vibrations of the rods 330x and 330y occurring when the X-axis transducer 320x and the Y-axis transducer 320y operate can be reduced or eliminated. Accordingly, the driving mechanism can output power with higher efficiency and an unnecessary vibration is not generated, so that a stable driving state which produces no audible noise can be achieved.

The driving apparatus in the aforementioned embodiment has the structure in which the bottom case 340x of the X-axis driving mechanism section 310x is fixed to the frame 302 and the rod 330y of the Y-axis driving mechanism section 310y is fixed to the holder 38. Alternatively, the rod 330x of the X-axis driving mechanism section 310x may be fixed to the frame 302, and the bottom case 340y or the rod 330y of the Y-axis driving mechanism section 310y may be fixed to the holder 38 with the bottom case 340y or the rod 330y being coupled to the bottom case 340x.

In the driving apparatus and the image pickup apparatus according to the present invention, the rod-shaped movable body is used as the moving target, and the transducer for generating an elliptical vibration is employed as the driving source. Accordingly, a large driving force can be obtained with a small mechanism. Also, the resonance of the movable body can be suppressed by the mass of the weight section mounted on the end portion of the movable body, and the driving apparatus can be highly efficient. Accordingly, the driving apparatus and the image pickup apparatus produce no backlash and no audible noise, and have high responsiveness and high accuracy.

The present invention is not limited to the aforementioned respective embodiments, and may be effected by making various modifications without departing from the scope in an implementation phase. Furthermore, the aforementioned embodiments include various stages of invention, and various inventions may be extracted by appropriately combining a plurality of constituent features disclosed.

For example, even if some of the constituent features are deleted from all the constituent features disclosed in the embodiments, the configuration obtained by deleting the constituent features may be extracted as the invention so long as the problems to be solved by the invention can be solved and the effects described above can be obtained.

What is claimed is:

1. An image pickup driving apparatus comprising:
a transducer for generating an elliptical vibration on a driving section in response to application of a voltage signal of a predetermined frequency;
a holding member having a holding section for holding the transducer and an image pickup device;
a pressing mechanism arranged on the holding member to press the driving section of the transducer;
and a rod-shaped movable body relatively driven by the elliptical vibration of the transducer while being pressed by the pressing mechanism and with a moving direction of the movable body being restricted by a guiding section of the holding member,
wherein a weight section is mounted on an end portion of the movable body, wherein the transducer contacts the rod-shaped movable body from a direction vertical to an axis direction of the rod-shaped movable body and the elliptical vibration generated by the transducer is applied to the rod-shaped movable body from the direction vertical to the axis direction of the rod-shaped movable body.

2. The driving apparatus according to claim 1, wherein the weight section is integrally formed with the movable body.

3. The driving apparatus according to claim 1, wherein the weight section is made of a material having a density equal to or higher than a density of the movable body, and is mounted on the movable body.

4. The driving apparatus according to claim 1, wherein the weight section is mounted on the movable body via a material having a vibration damping property.

5. The driving apparatus according to claim 1, wherein the weight section restricts a relative moving area of the movable body by butting against a moving amount restriction section provided on a fixing section that relatively moves with respect to the movable body.

6. An image pickup driving apparatus comprising:
a first driving mechanism having: a first transducer for generating an elliptical vibration on a driving section in response to application of a voltage signal of a predetermined frequency;
a first holding member having a holding section for holding the first transducer and an image pickup device;
a first pressing mechanism arranged on the first holding member to press the driving section of the first transducer;
and a first movable body relatively driven by the elliptical vibration of the first transducer while being pressed by the first pressing mechanism and with a moving direction of the first movable body being restricted by a guiding section of the first holding member;
a second driving mechanism having: a second transducer for generating an elliptical vibration on a driving section in response to application of a voltage signal of a predetermined frequency;
a second holding member having a holding section for holding the second transducer and the image pickup device;
a second pressing mechanism arranged on the second holding member to press the driving section of the second transducer;
and a second movable body relatively driven by the elliptical vibration of the second transducer while being pressed by the second pressing mechanism and with a moving direction of the second movable body being restricted by a guiding section of the second holding member;
a fixing member to which the first holding member or the first movable body of the first driving mechanism is fixed;
and a coupling body for coupling an end portion of the first movable body and an end portion of the second movable body; wherein the coupling body has a density equal to or higher than a density of the movable body;
wherein the first transducer contacts the first movable body from a direction vertical to an axis direction of the first movable body and the elliptical vibration generated by the first transducer is applied to the first movable body from the direction vertical to the axis direction of the first movable body.

7. The driving apparatus according to claim 6, wherein the first driving mechanism and the second driving mechanism have a substantially same shape.

8. An image pickup apparatus comprising:
a first driving mechanism having
a first transducer for generating an elliptical vibration on a driving section in response to application of a voltage signal of a predetermined frequency,
a first holding member having a holding section for holding the first transducer,
a first pressing mechanism arranged on the first holding member to press the driving section of the first transducer, and
a first movable body relatively driven by the elliptical vibration of the first transducer while being pressed by the first pressing mechanism and with a moving direction of the first movable body being restricted by a guiding section of the first holding member, the first movable body being rotatably held about a first axis parallel to the moving direction, and a weight section being mounted on an end portion of the first movable body;
a second driving mechanism having
a second transducer for generating an elliptical vibration on a driving section in response to application of a voltage signal of a predetermined frequency,
a second holding member having a holding section for holding the second transducer,
a second pressing mechanism arranged on the second holding member to press the driving section of the second transducer, and
a second movable body relatively driven by the elliptical vibration of the second transducer while being pressed by the second pressing mechanism and with a moving direction of the second movable body being restricted by a guiding section of the second holding member, the second movable body being rotatably held about a second axis parallel to the moving direction, and a weight section being mounted on an end portion of the second movable body;
a movable frame fixed to the second holding member;
a fixing member on which the first holding member or the first movable body of the first driving mechanism is mounted;
a coupling body for coupling the first movable body or the first holding member and the second movable body or the second holding member such that driving directions of the first movable body or the first holding member and the second movable body or the second holding member substantially perpendicularly intersect with each other at an end portion;
rolling bodies respectively press-held between the movable frame and the fixing member at positions apart from the first axis and the second axis to restrict rotation about the first axis and rotation about the second axis;
an image pickup device mounted on the movable frame to convert an image formed by a photographing lens to an electrical signal; and
a shake detector for detecting a shake of a camera main body to which the fixing member and the photographing lens are attached;
wherein shake correction is performed by driving the first driving mechanism and the second driving mechanism based on a signal from the shake detector.

* * * * *